(12) United States Patent
Silvio et al.

(10) Patent No.: US 8,505,868 B2
(45) Date of Patent: *Aug. 13, 2013

(54) TIE DOWN ASSEMBLY

(75) Inventors: Franklin David Silvio, Natrona Heights, PA (US); James T. Burg, Verona, PA (US); Robert J. Speer, Upper Burrell, PA (US); Brett P. Conner, Allison Park, PA (US); Jean Ann Skiles, Gibsonia, PA (US)

(73) Assignee: Alcoa Inc., Pittsburgh, PA (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/948,931

(22) Filed: Nov. 18, 2010

(65) Prior Publication Data

US 2011/0284716 A1 Nov. 24, 2011

Related U.S. Application Data

(60) Provisional application No. 61/336,314, filed on Jan. 20, 2010.

(51) Int. Cl.
*B65D 63/00* (2006.01)

(52) U.S. Cl.
USPC ............................................. 248/499; 410/106

(58) Field of Classification Search
USPC ............... 248/499, 500, 503, 505; 52/677, 52/678, 719; 410/101, 106, 108, 113
See application file for complete search history.

(56) References Cited

U.S. PATENT DOCUMENTS

| | | | |
|---|---|---|---|
| 2,962,245 A * | 11/1960 | Molzan et al. | 244/115 |
| 3,365,162 A | 1/1968 | Davis | |
| 3,427,996 A | 2/1969 | Matias | |
| 3,694,866 A | 10/1972 | Maier | |
| 3,888,190 A | 6/1975 | Bigge | |
| 3,927,623 A | 12/1975 | Caron | |

(Continued)

FOREIGN PATENT DOCUMENTS

| | | |
|---|---|---|
| DE | 199 04 366 C1 | 2/1999 |
| EP | 0 424 083 A1 | 4/1991 |
| EP | 1 609 717 A1 | 12/2005 |
| WO | 2009/132390 A1 | 11/2009 |

OTHER PUBLICATIONS

International Search Report and Written Opinion for PCT/US2010/027317, mailed Jun. 22, 2011.

(Continued)

*Primary Examiner* — Gwendolyn Baxter
(74) *Attorney, Agent, or Firm* — Greenberg Traurig, LLP

(57) ABSTRACT

A tie down assembly adapted to be installed within a structure includes a cup and a crossbar that is fastened removably to the cup by a plurality of fasteners. The cup includes a recess forming an interior surface, and a plurality of seats extending from the interior surface. The crossbar includes a central portion and a plurality of elongated members extending therefrom. Each of the members includes a head that engages a corresponding one of the seats of the cup and is secured to the seat by one of the fasteners. The central portion of the crossbar may include a central aperture that receives one of the fasteners for an additional attachment point to the cup. The crossbar is adapted to receive tie down hooks, connectors, and the like. When the crossbar requires repair or replacement, it may be removed from the cup by unfastening the fasteners without the need to remove the cup from the structure.

19 Claims, 35 Drawing Sheets

(56) References Cited

U.S. PATENT DOCUMENTS

| | | |
|---|---|---|
| 4,091,744 A | 5/1978 | Crissy et al. |
| 4,099,661 A | 7/1978 | Dick et al. |
| 4,151,974 A | 5/1979 | Kuhn |
| 4,193,529 A | 3/1980 | Dick et al. |
| 4,877,361 A | 10/1989 | DeRosa et al. |
| 4,907,921 A | 3/1990 | Akright |
| 4,945,849 A | 8/1990 | Morris et al. |
| 5,052,869 A | 10/1991 | Hansen, II |
| 5,535,694 A | 7/1996 | Czipri |
| 6,585,466 B2 | 7/2003 | Zhan et al. |
| 6,709,209 B2 | 3/2004 | Zhan et al. |
| 6,764,259 B1 | 7/2004 | Preta |
| 6,935,602 B2 | 8/2005 | Hardie |
| 7,134,819 B2 | 11/2006 | Bullock et al. |
| 7,390,155 B1 | 6/2008 | Diaz et al. |
| 7,686,551 B2 | 3/2010 | Grasso |
| 7,798,753 B2 | 9/2010 | Yurgevich |
| 8,075,232 B2 | 12/2011 | Le |
| 8,197,166 B2 * | 6/2012 | Stull et al. .................. 410/106 |
| 8,220,209 B2 | 7/2012 | Roy et al. |
| 2004/0099197 A1 | 5/2004 | King |
| 2006/0054068 A1 | 3/2006 | Fockler et al. |
| 2006/0133907 A1 | 6/2006 | Bullock et al. |
| 2008/0087782 A1 | 4/2008 | Sutherland et al. |
| 2010/0284758 A1 | 11/2010 | Le |
| 2011/0210227 A1 | 9/2011 | Burg et al. |
| 2012/0107067 A1 | 5/2012 | Meszaros |

OTHER PUBLICATIONS

International Search Report and Written Opinion issued in connection with International Patent Application No. PCT/US2010/045048 entitled "Tie Down Assembly" (8 pages).

Hull Standard Drawing—Aircraft Securing and Engine Run-Up Fittings, Department of the Navy, Naval Ships System Command, Drawing No. F53711803/1916300N, Jul. 11, 2005 (15 pages).

U.S. Appl. No. 12/723,995, filed Mar. 15, 2010 for Tie Down Assembly (52 pages, including cover page).

U.S. Appl. No. 12/853,868, filed Aug. 10, 2010 for Tie Down Assembly (49 pages, including cover page).

International Search Report and Written Opinion issued in connection with Applicants' International Application No. PCT/US2010/057189 (6 pages).

* cited by examiner

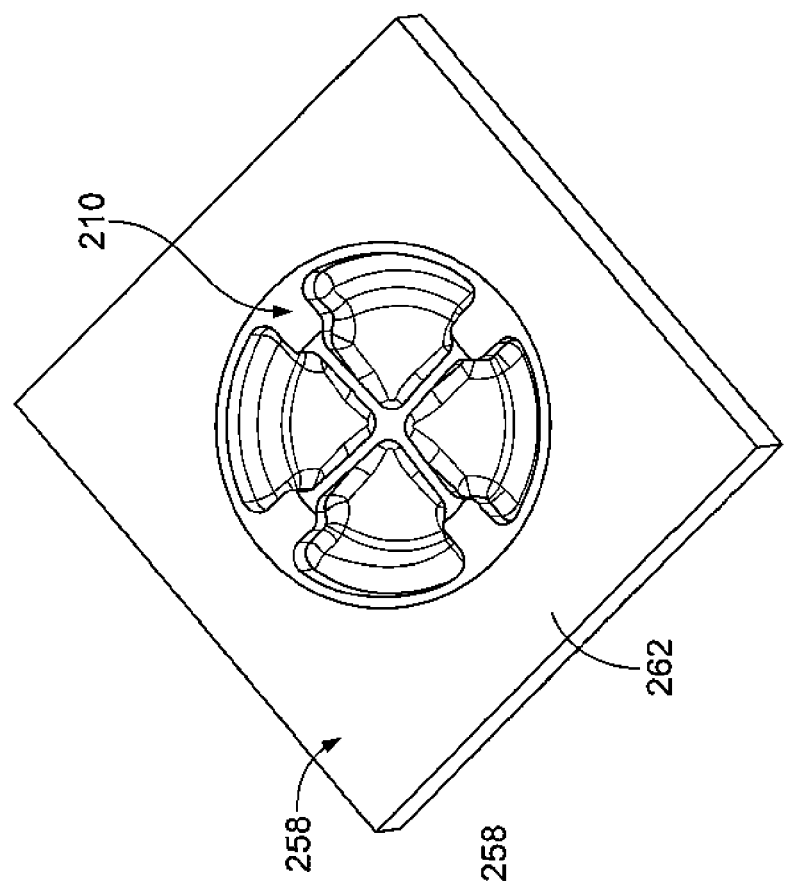
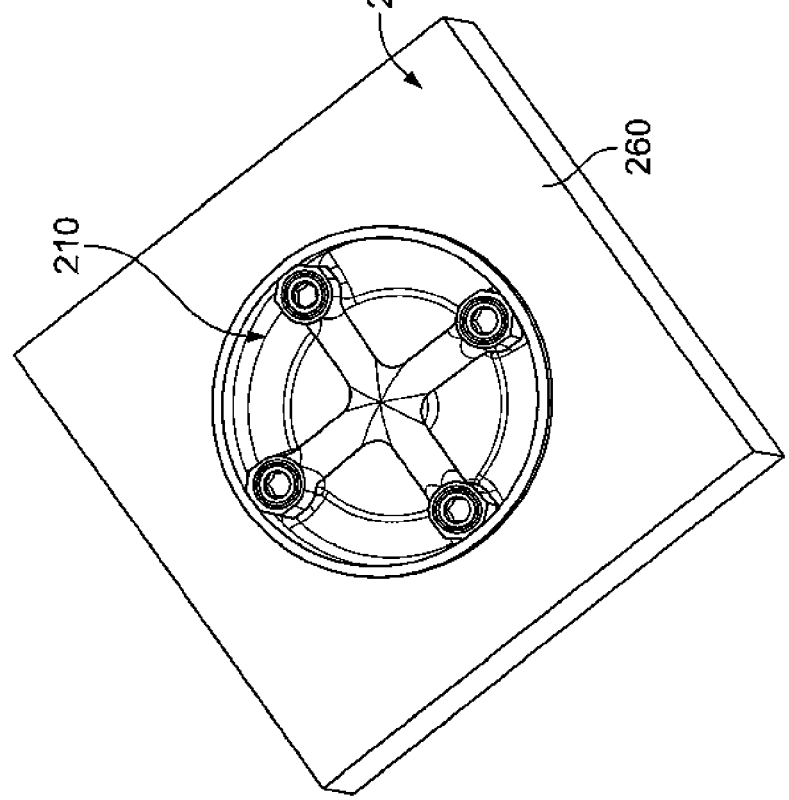
FIG. 9B
FIG. 9A

TIE DOWN ASSEMBLY

CROSS-REFERENCE TO RELATED APPLICATION

This application is a Section 111(a) application relating to commonly owned, U.S. Provisional Application Ser. No. 61/336,314 entitled "TIE DOWN ASSEMBLY", filed Jan. 20, 2010, the entirety of which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of U.S. Government Contract No. N00167-07-D-0010 awarded by the Naval Surface Warfare Center, Carderock Division.

FIELD OF THE INVENTION

The present invention relates to a tie down assembly and, more particularly, to a tie down assembly for naval and maritime vessels.

BACKGROUND

Tie down assemblies are commonplace on naval and maritime vessels, as they facilitate the security of cargo, containers, vehicles (such as aircraft, tanks and trucks), and other heavy items and equipment. Tie down assemblies are typically installed within a deck of the vessel. Tie down assemblies must be sufficiently secured within the deck and be strong enough to endure heavy loads. In addition, it is desirable for tie down assemblies to be easily repaired and replaced within the deck.

SUMMARY OF THE INVENTION

In an embodiment, a tie down assembly adapted to be installed within a structure includes a cup and a crossbar that is fastened removably to the cup by a plurality of fasteners. In an embodiment, the cup includes a first end, a second end opposite the first end, a recess formed within the first end and defining an interior surface and an inner wall surrounding the interior surface, and a plurality of seats extending from the interior surface. In an embodiment, each of the plurality of seats includes a bore. In an embodiment, the crossbar includes a central portion and a plurality of members extending from the central portion. In an embodiment, each of the plurality of members includes a free end having a head and an aperture formed within the head. In an embodiment, the crossbar is positioned within the recess of the cup and each of the heads of the plurality of members of the crossbar engages a corresponding one of the plurality of seats of the cup. In an embodiment, each of the apertures of the heads of the crossbar aligns with a corresponding one of the bores of the plurality of seats of the cup. In an embodiment, each of the aligned apertures receive a corresponding one of the plurality of fasteners.

In an embodiment, the cup includes a plurality of pockets formed within the inner wall of the cup, and each of the plurality of seats of the cup is positioned within a corresponding one of the plurality of pockets of the cup. In an embodiment, each of the plurality of pockets of the cup includes a pair of sidewalls, each of the heads of the plurality of members of the crossbar being positioned between a corresponding one of the pair of sidewalls. In an embodiment, the sidewalls act as stops that inhibit rotation of the crossbar relative to the cup when a load is applied to the crossbar.

In an embodiment, the crossbar is adapted to receive tie down hooks, connectors, and the like. In an embodiment, when the crossbar requires repair or replacement, it may be removed from the cup by unfastening the fasteners without the need to remove the cup from the structure. In an embodiment, the cup is made from aluminum, while the crossbar is made from steel. In an embodiment, the structure is an aluminum deck of a vessel.

BRIEF DESCRIPTION OF THE DRAWINGS

Reference is made to the following detailed description of the exemplary embodiments considered in conjunction with the accompanying drawings, in which:

FIGS. 9A and 9B are top and bottom perspective views, respectively, of the tie down assembly shown in FIG. 7A installed within a deck of a vessel;

DETAILED DESCRIPTION OF THE OF THE EXEMPLARY EMBODIMENTS

Figure 1A:
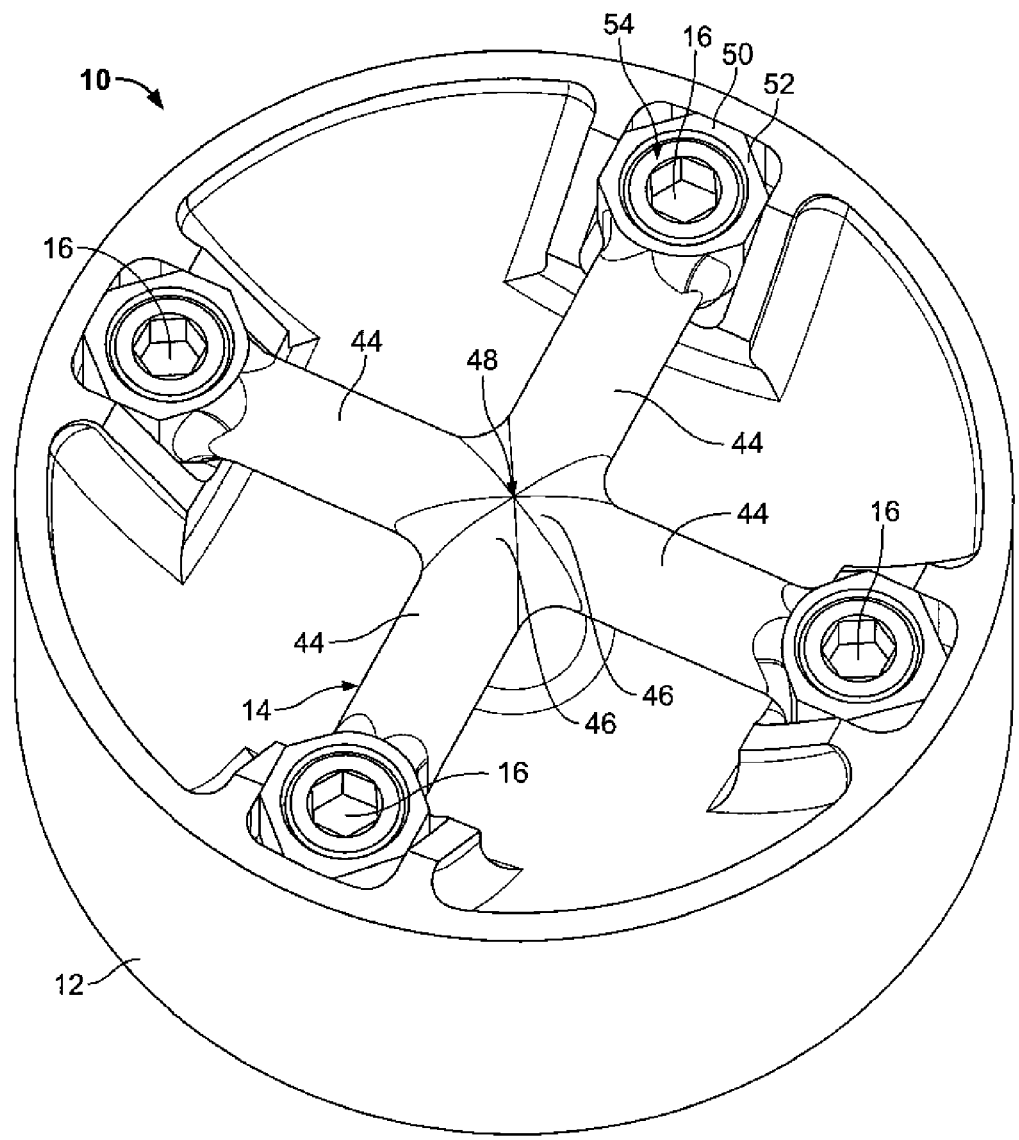
FIG. 1A is a top perspective view of a tie down assembly in accordance with an embodiment of the present invention.
Figure 1B:
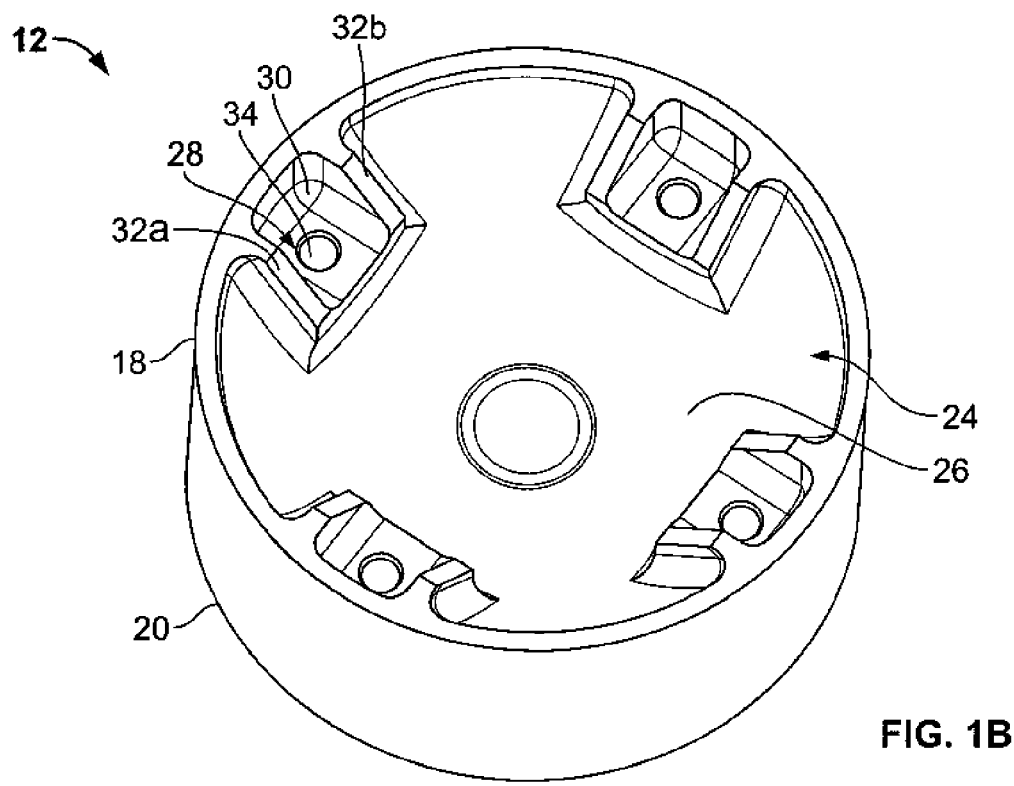
FIG. 1B is a top perspective view of a cup employed by the tie down assembly shown in FIG. 1A.

Referring to FIG. 1A, a tie down assembly 10 includes a cylindrical-shaped cup 12 and a cross-shaped crossbar 14 that is fastened removably to the cup 12 by a plurality of fasteners 16. In an embodiment, the cup 12 is made from aluminum and the crossbar 14 is made from steel. In other embodiments, the cup 12 is made from an aluminum-magnesium-silicon alloy (6000 series alloy), an aluminum-magnesium alloy (5000 series alloy), or another marine specified aluminum alloy. In an embodiment, the crossbar 14 is made from 4130 steel. In other embodiments, the crossbar 14 is made from other marine specified steel, aluminum, or titanium. In other embodiments, the cup 12 and the crossbar 14 are made from other suitable materials known in the art, such as other types of metals or metal alloys. In an embodiment, the cup 12 and the crossbar 14 are produced by forging. In another embodiment, the cup 12 is produced by machining. In other embodiments, the crossbar 14 is produced by machining, or by forging and machining. While the cup 12 is cylindrical-shaped, it may consist of other shapes and sizes, in accordance with other embodiments. While the crossbar 14 is cross-shaped, it may consist of other shapes and sizes, in accordance with other embodiments. The features and functions of the cup 12 and the crossbar 14 shall be described hereinafter.

Referring to FIGS. 1B and 2A through 2E, the cup 12 includes an upper end 18 and a lower end 20 that is opposite the upper end 18, and a ring-shaped sidewall 22 that extends from the upper end 18 to the lower end 20. The cup 12 includes a recess 24 that extends from the upper end 18 and is defined by a concave interior surface 26. A plurality of pockets 28 are formed on the interior surface 26 of the cup 12. Each of the pockets 28 includes a seat 30 and a pair of opposed angular walls 32a, 32b that extend upwardly from the interior surface 26 of the cup 12 to the upper end 18 of the cup 12 and flank the seat 30. Each of the pockets 28 includes a counter bore 34 that is formed within the corresponding seat 30 and extends towards the lower end 20 of the cup 12. Each of the counter bores 34 is sized and shaped to receive a corresponding one of the fasteners 16, which will be described in more detail below. In an embodiment, each of the counter bores 34 includes internal threads (not shown in the Figures). In an embodiment, the cup 12 includes four of the pockets 28, which are arranged in a cross-like pattern (i.e., positioned 90 degrees from each other) on the interior surface 26 of the cup 12. In other embodiments, the cup 12 may include more or less than four of the pockets 28.

Figure 2A:
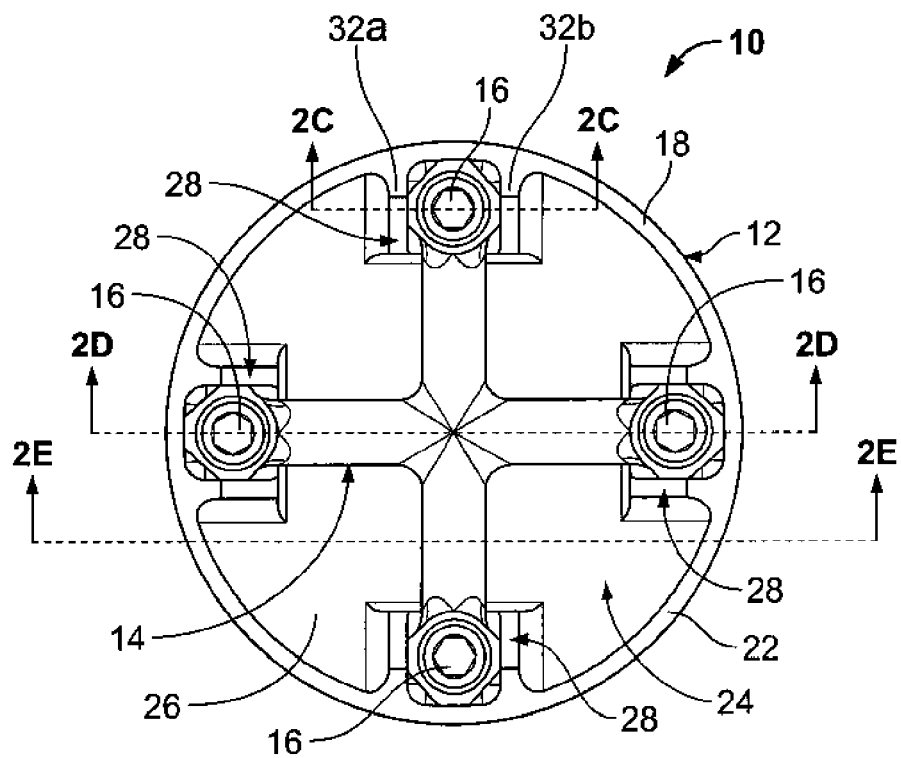
FIGS. 2A and 2B are top and bottom plan views, respectively, of the tie down assembly shown in FIG. 1A.
Figure 2B:
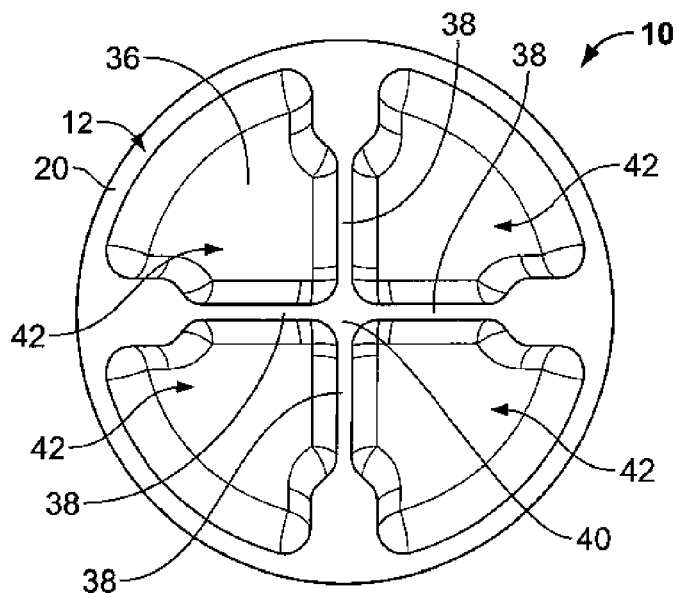
Figure 2C:
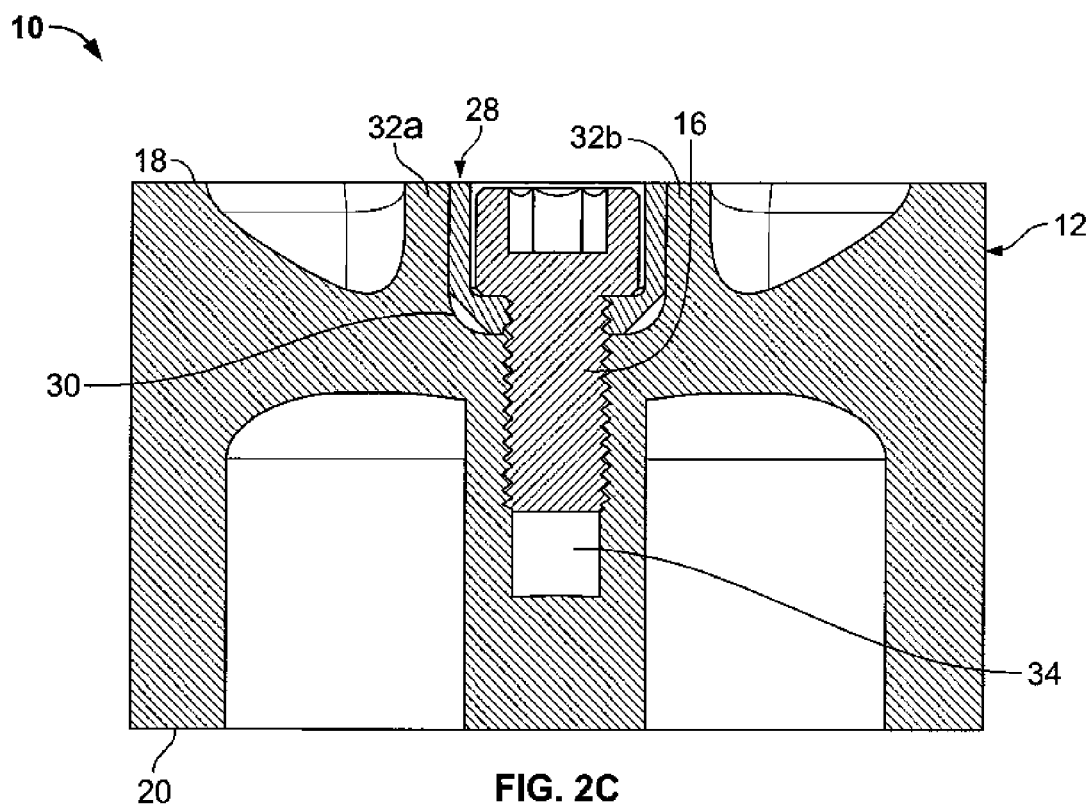
FIG. 2C is a cross-sectional view, taken along line 2C-2C and looking in the direction of the arrows, of the tie down assembly shown in FIG. 2A.
Figure 2D:
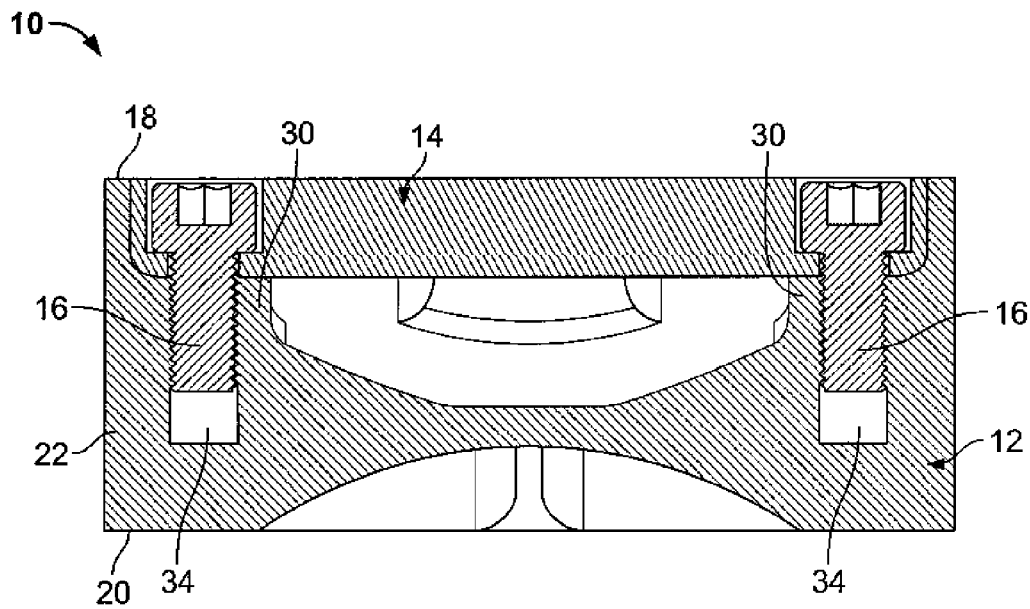
FIG. 2D is a cross-sectional view, taken along line 2D-2D and looking in the direction of the arrows, of the tie down assembly shown in FIG. 2A.
Figure 2E:
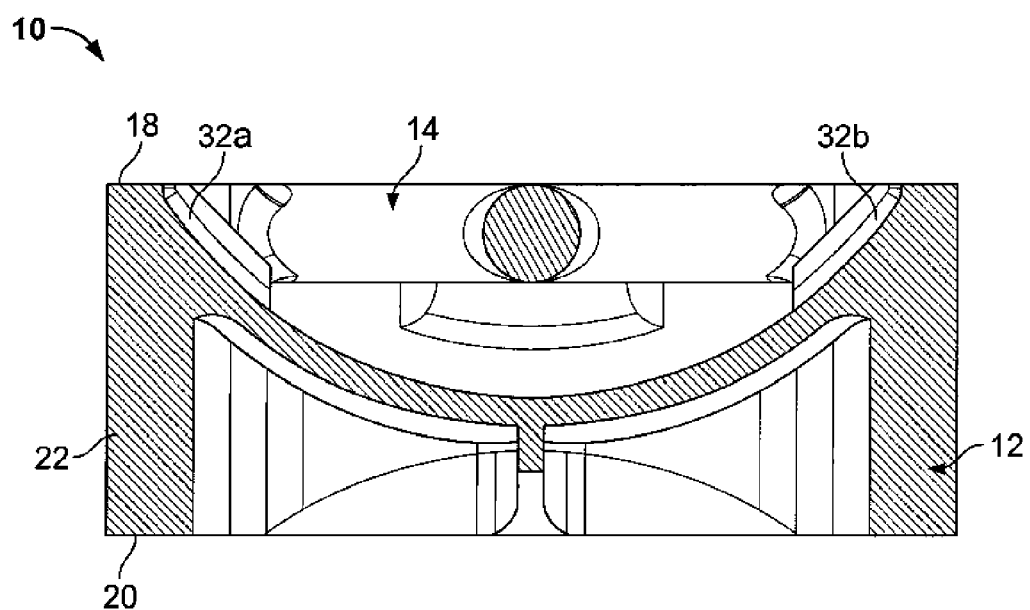
FIG. 2E is a cross-sectional view, taken along line 2E-2E and looking in the direction of the arrows, of the tie down assembly shown in FIG. 2A.

Referring to FIG. 2B, a lower, exterior surface 36 of the cup 12 includes a plurality of ribs 38 extending therefrom and from the lower end 20 of the cup 12 to a central portion 40, and are separated from one another by a plurality of gaps 42. The ribs 38 provide for strength and stiffness, while the gaps 42 result in mass reduction of the tie down assembly 10. In an embodiment, the ribs 38 are arranged in a cross-like pattern (i.e., positioned 90 degrees from each other) on the exterior surface 36. In other embodiments, the cup 12 may include more or less than four of the ribs 38.

Figure 1C:
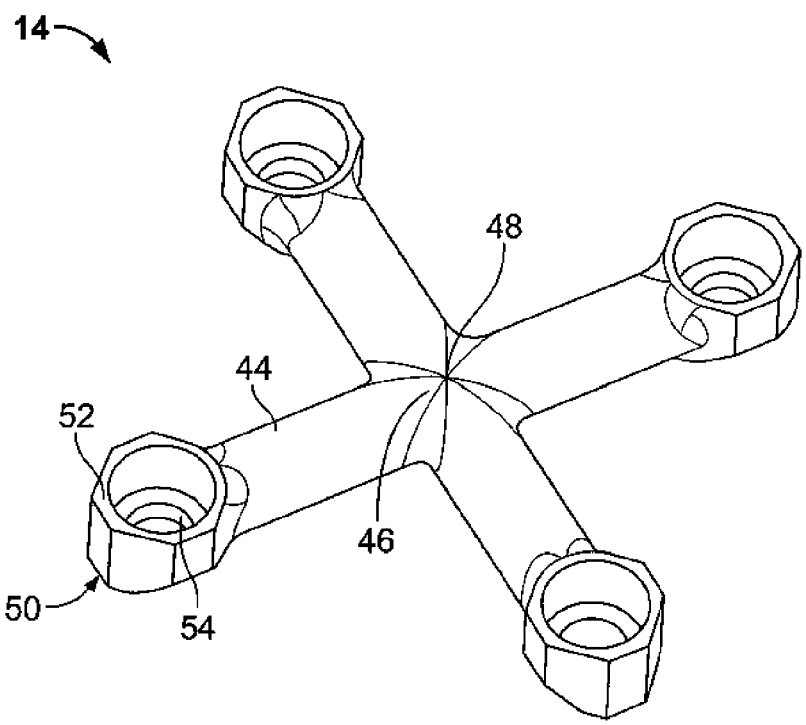
FIGS. 1C and 1D are top and bottom perspective views, respectively, of a crossbar employed by the tie down assembly shown in FIG. 1A.
Figure 1D:
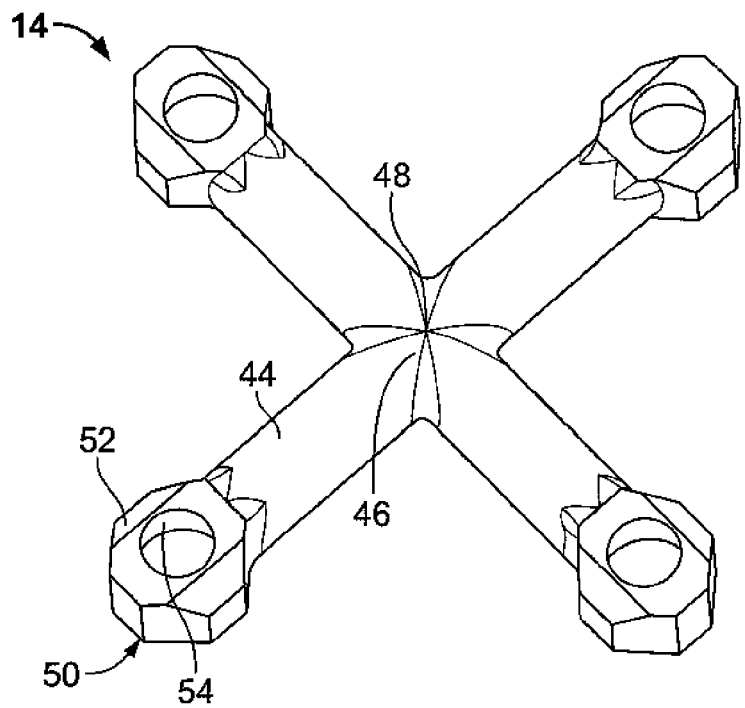

Referring to FIGS. 1A, 1C and 1D, the crossbar 14 includes a plurality of tubular-shaped members 44, each of which has a first end 46 that intersects with the other first ends 46 at a central point 48, and a free end 50 opposite the first end 46. In an embodiment, all of the members 44 lie within the same plane. In an embodiment, the crossbar 14 includes four of the members 44. In other embodiments, the crossbar 14 includes more or less than four of the members 44. In an embodiment, each of the members 44 includes a hexagonal-shaped head 52 formed at the free end 50 thereof and a centrally located, circular-shaped aperture 54 extending through the head 52. In other embodiments, each of the heads 52 consists of different shapes and sizes, such as square-shaped, circular-shaped, etc.

Referring to FIGS. 1A through 2E, the crossbar 14 is fastened to the cup 12 by the fasteners 16. In this regard, the crossbar 14 is positioned within the recess 24 of the cup 12, such that one of heads 52 of the crossbar 14 is positioned within a corresponding one of the pockets 28 of the cup 12. As a result, one of the apertures 54 of the members 44 of the crossbar 14 aligns with a corresponding one of the counter bores 34 of the cup 12. Each of the fasteners 16 threadedly engages a corresponding one of the counter bores 34 of the cup 12, thereby securing the crossbar 14 to the cup 12. In an embodiment, the fasteners 16 include uncoated, high strength bolts made from corrosion resistant materials, such as Mond or stainless steel. In another embodiment, the fasteners 16 include anti-corrosion, coated steel threaded bolts, such as GEOMET® bolts manufactured by Metal Coatings International Inc. In an embodiment, the fasteners 16 include self-sealing bolts having embedded O-rings. In an embodiment, the fasteners 16 include bolts separated from the O-rings and assembled together. In an embodiment, O-rings are positioned within grooves formed within the seats 30 of the pockets 28 (not shown in FIGS. 2A through 2E) in order to provide water tight seals and corrosion resistance between the pockets 28 and the heads 52 of the crossbar 14. In an embodiment, the O-rings are made from VITON® brand of synthetic rubber or fluropolymer elastomer, made by DuPont Performance Elastomers L.L.C. In an embodiment, the counter bores 34 are applied with a water repellent sealant (not shown in the Figures). In an embodiment, the sealant is SIKAFLEX® 221 adhesive sealant. In an embodiment, each of the counter bores 34 is sized and shaped to include threaded inserts (not shown in FIGS. 1A through 2E) that threadedly engage a corresponding one of the fasteners 16. In an embodiment, the threaded inserts are RECOIL® brand of inserts manufactured by Alcoa Fastening Systems, but other brands of inserts may be utilized.

Figure 3B:
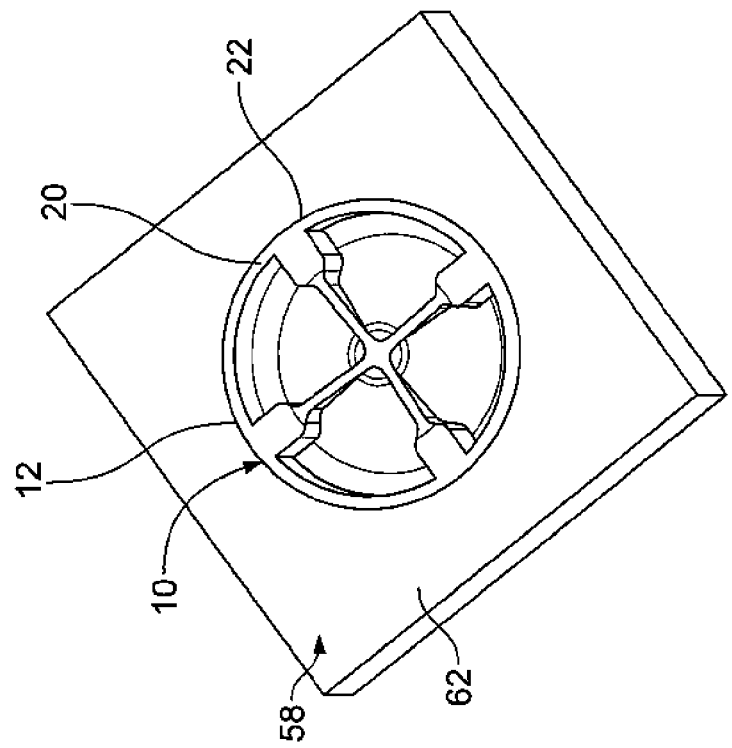
FIGS. 3A and 3B are top and bottom perspective views, respectively, of the tie down assembly shown in FIG. 1A installed within a deck of a vessel.
Figure 3A:
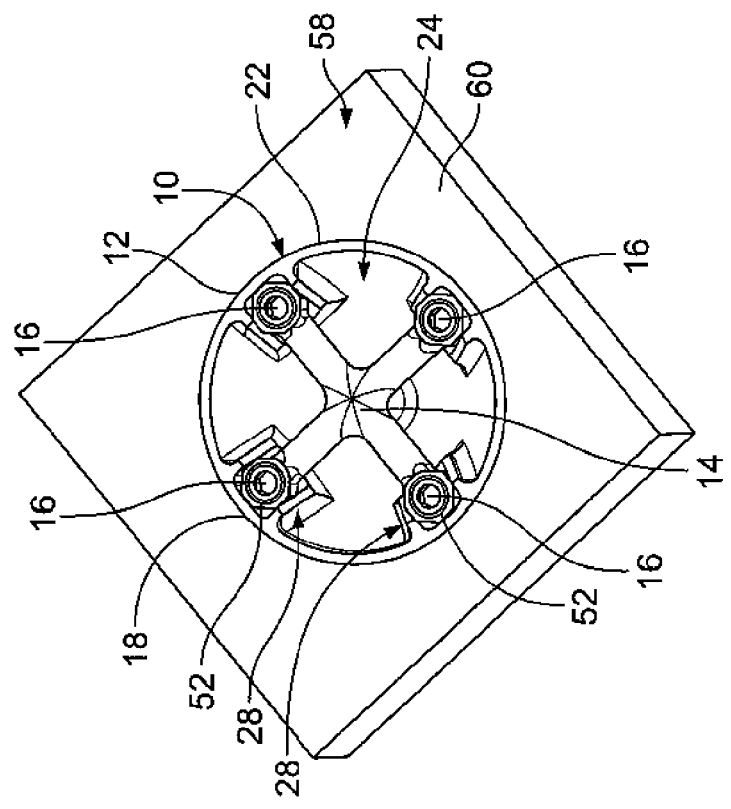
Figure 4A:
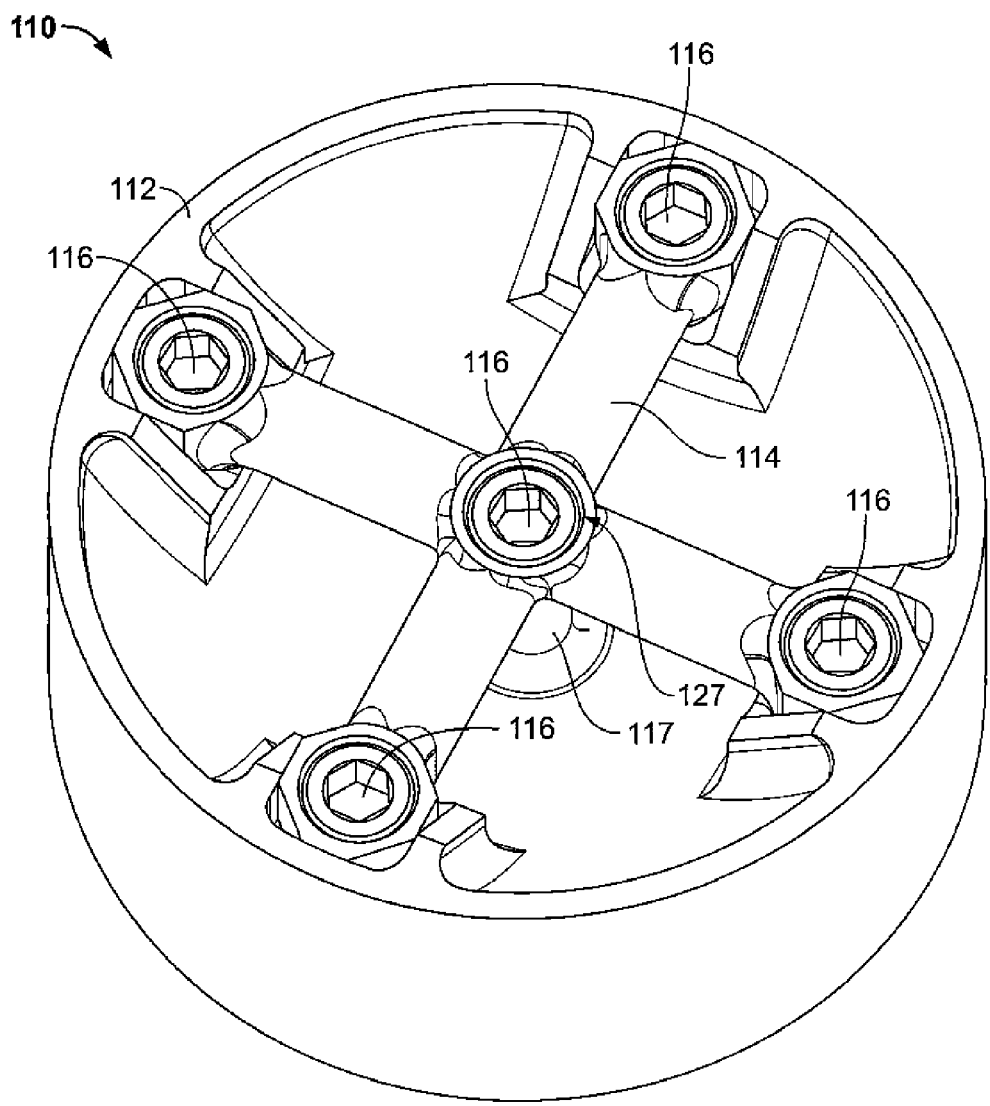
FIG. 4A is a top perspective view of a tie down assembly in accordance with another embodiment of the present invention.
Figure 4B:
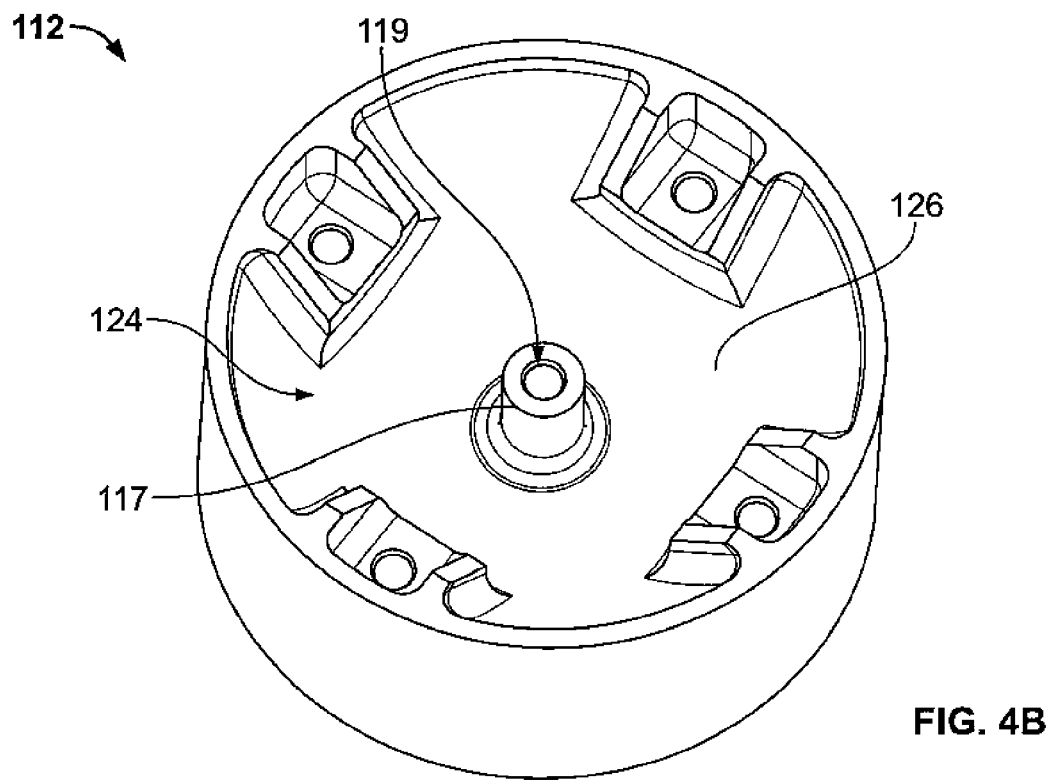
FIG. 4B is a top perspective view of a cup employed by the tie down assembly shown in FIG. 4A.
Figure 4C:
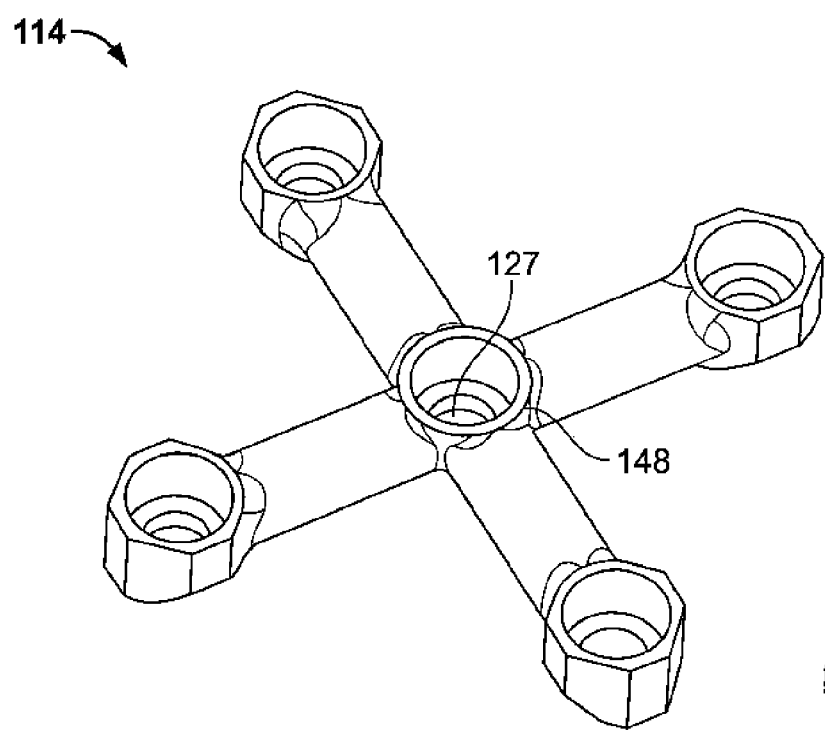
FIGS. 4C and 4D are top and bottom perspective views, respectively, of a crossbar employed by the tie down assembly shown in FIG. 4A.
Figure 4D:
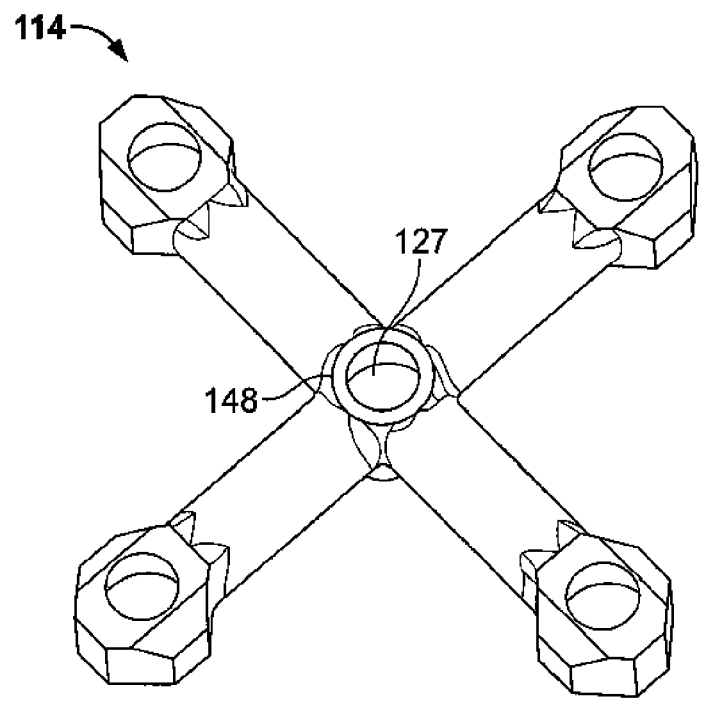
Figure 5A:
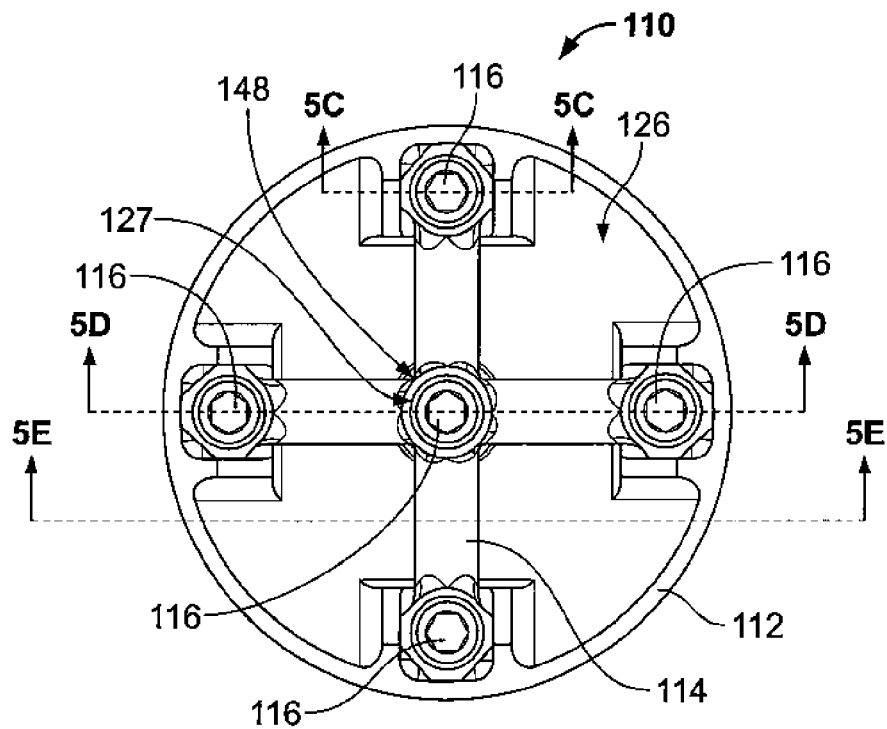
FIGS. 5A and 5B are top and bottom plan views, respectively, of the tie down assembly shown in FIG. 4A.
Figure 5B:
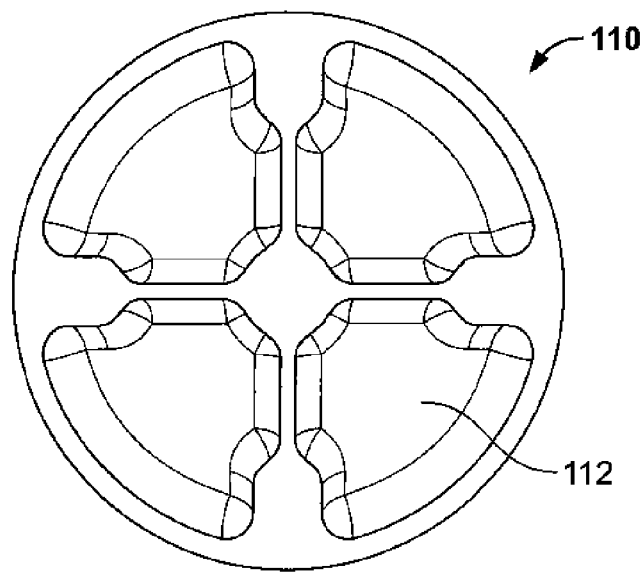
Figure 5C:
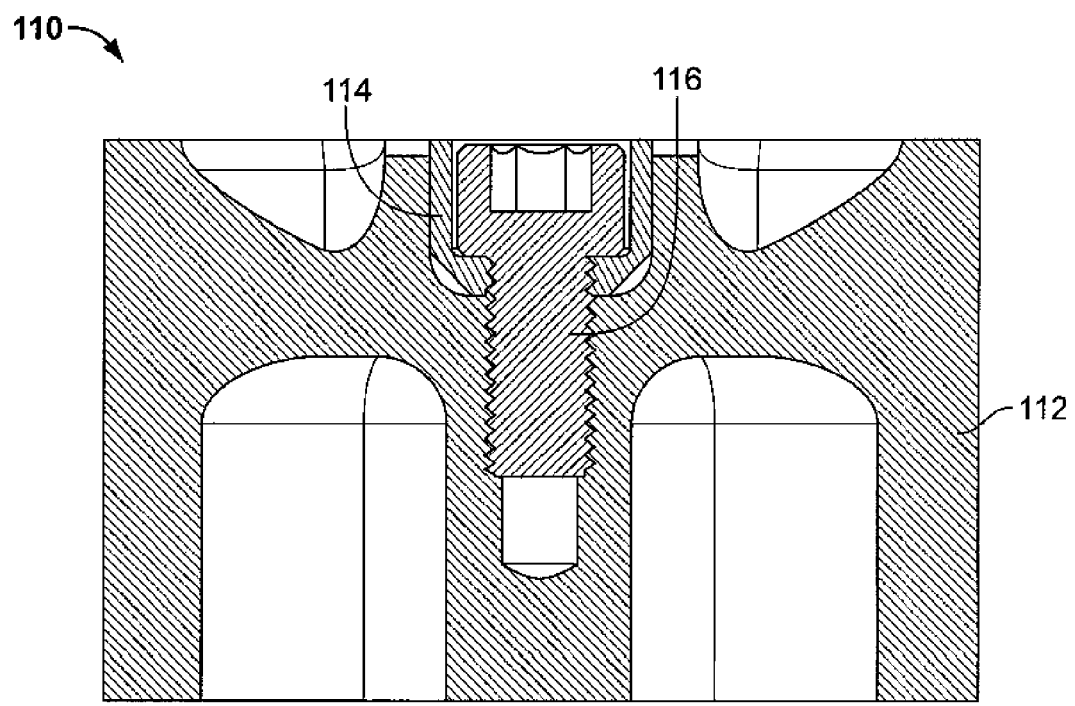
FIG. 5C is a cross-sectional view, taken along line 5C-5C and looking in the direction of the arrows, of the tie down assembly shown in FIG. 5A.
Figure 5D:
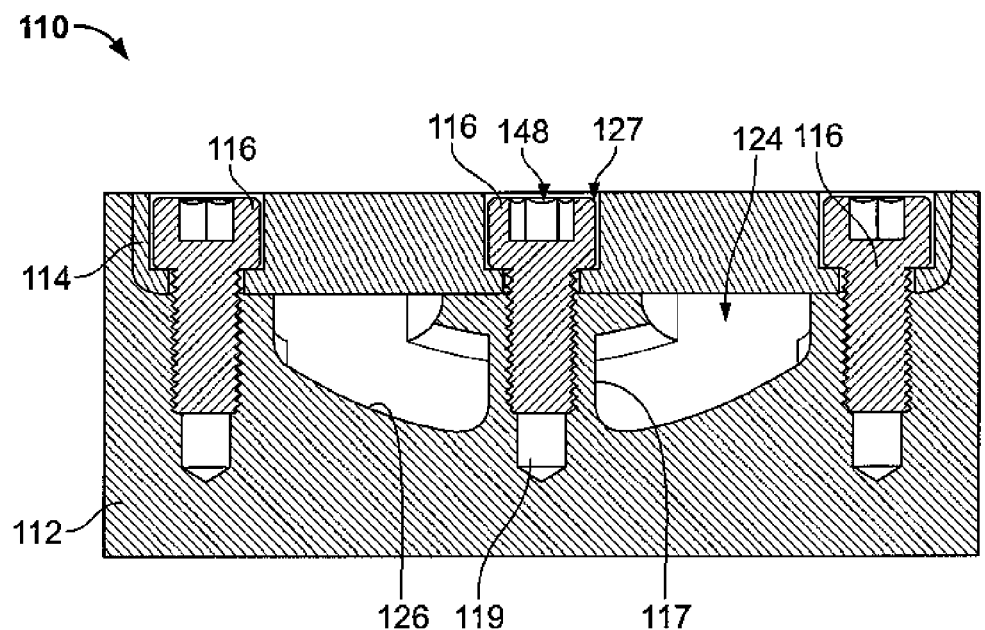
FIG. 5D is a cross-sectional view, taken along line 5D-5D and looking in the direction of the arrows, of the tie down assembly shown in FIG. 5A.
Figure 5E:
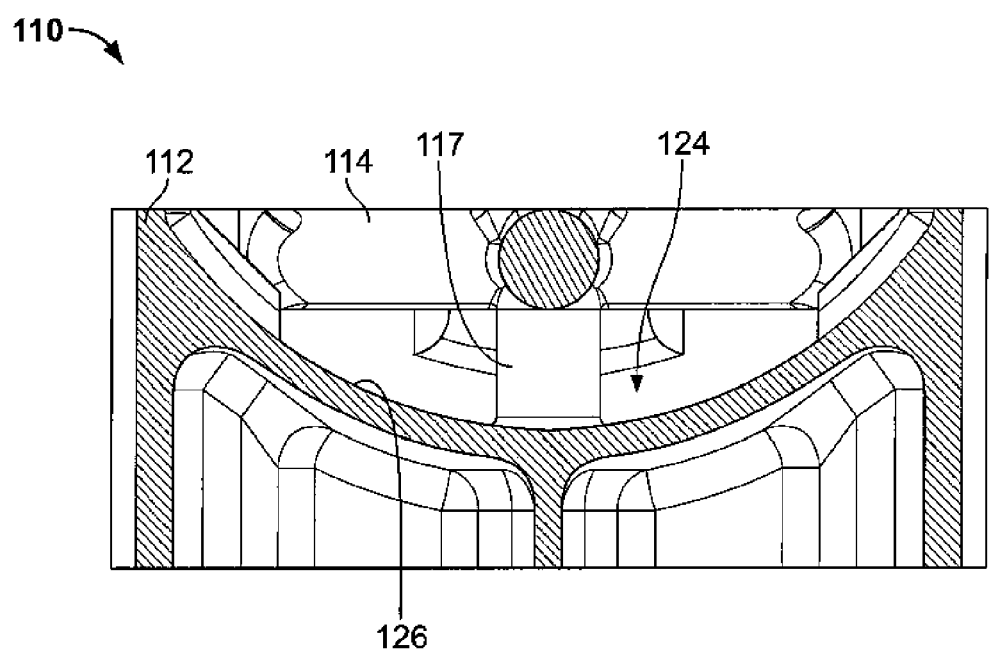
FIG. 5E is a cross-sectional view, taken along line 5E-5E and looking in the direction of the arrows, of the tie down assembly shown in FIG. 5A.

Referring to FIGS. 3A and 3B, the tie down assembly 10 is installed within a deck 58 of a vessel having an exterior surface 60 and an interior surface 62. In an embodiment, the deck 58 is made from aluminum. In other embodiments, the deck 58 is made from other materials, such as metals and metal alloys. In an embodiment, the deck 58 includes a solid portion(s). In another embodiment, the deck 58 is corrugated (not shown in the Figures). In another embodiment, the deck 58 is a multi-hollow extrusion (not shown in the Figures). In another embodiment, the deck 58 is characterized by complex structural geometry (not shown in the Figures).

To install the tie down assembly 10, a hole is bored in the deck 58 from the exterior surface 60 to the interior surface 62 (not shown in the Figures). The diameter of the hole is substantially equal to the diameter of the sidewall 22 of the cup 12. Next, the tie down assembly 10 is positioned within the hole. In an embodiment, the radial clearance between the sidewall 22 of the cup 12 and the hole of the deck 58 is about 0.0197 inches±0.004 inches (0.5 mm±0.1 mm). In an embodiment, the upper end 18 of the cup 12 protrudes above the exterior surface 60 of the deck 58, while the lower end 20 of the cup 12 protrudes below the interior surface 62 of the deck 58, leaving the crossbar 14 and the recess 24 of the cup 12 exposed within the exterior surface 60 of the deck 58. In another embodiment, the upper end 18 of the cup 12 lies flush with the exterior surface 60 of the deck 58, while the lower end 20 of the cup 12 lies flush with the interior surface 62 of the deck 58. To secure the tie down assembly 10 to the deck 58, the upper end 18 of the cup 12 is welded to the exterior surface 60 of the deck 58, while the lower end 20 of the cup 12 is welded to the interior surface 62 of the deck 58. When the crossbar 14 is installed within the cup 12, the depth of the pockets 28 ensure that the crossbar 14 is positioned flush with the upper end 18 of the cup 12.

In an embodiment, the crossbar 14 is sized and shaped to accommodate the receipt of various tie down connectors, such as hooks, clips, cables, rope, etc. (not shown in the Figures). The crossbar 14 provides uniform load distribution for the tie down assembly 10. In this regard, there are tight radial fits between the heads 52 of the crossbar 14 and the pockets 28 of the cup 12 to react against shear loads. Moreover, the walls of the pockets 28 prevent rotation of the crossbar 14 relative to the cup 12, especially during lashing, which react against torques and shear loads imparted on the crossbar 14. The crossbar 14 reacts against axial loads as well, which are borne by the fasteners 16.

In the event that the crossbar 14 requires, inspection, repair or replacement, it is easily removed from the deck 58 by removing the fasteners 16 from the crossbar 14 and the cup 12 using standard tools (e.g., socket wrenches, etc.). As a result, the crossbar 14 is easily lifted out of the cup 12, while the cup 12 remains secured to the deck 58. Consequently, the entire tie down assembly 10 need not be removed or cut out to inspect, repair or replace the crossbar 14.

In an embodiment, the cup 12 is made from aluminum, while the crossbar 14 is made from steel, as mentioned above. Thus, in an embodiment, the tie down assembly 10 utilizes the advantages of both aluminum and steel. For example, in an embodiment, the cup 12 is lightweight (e.g., approximately 50% weight savings), corrosion resistant, and allows for the tie down assembly 10 to be installed into the aluminum deck 58 without the need for costly and lengthy manufacturing and installation processes. Accordingly, the tie down assembly 10 does not require any changes in a shipbuilder's manufacturing process, while at the same time offers the advantages of being lightweight and allowing easy replacement and inspection of the assembly 10. Lower weight savings also translates into lower fuel consumption over the lifetime of the vessel. On the other hand, the steel crossbar 14 maintains high strength, especially during lashing. In addition, the tie down assembly 10 requires minimal assembly time and skill to install, thereby reducing installation costs. Last but not least, the tie down assembly 10 is compact and requires less space to install.

In an embodiment, the crossbar 14 may be coated with a coating for preventing wear from where the crossbar 14 makes contact with the tie-down hooks. In an embodiment, the coating composition may consist of an aluminum/stainless steel blend manufactured by Alcoa Inc., and which is the subject of U.S. Pat. Nos. 5,884,388 and 6,290,032, which are incorporated herein by reference. In other embodiments, the coating may include an electroless nickel phosphorous coating, such as NIBORE™ brand of coating, a diamond chrome coating, a hard chrome coating, or a nickel cobalt coating, all of which are supplied by Bales Mold Service Inc. of Downers Grove, Ill. In other embodiments, the coating may include a wear-resistant cubic boron nitride, hard powder coating, such as TUFFTEK® brand of coating supplied by NanoMech, LLC d/b/a Duralor of Springdale, Ark. In other embodiments, other suitable coatings that prevent wear and are known in the art may be utilized.

FIGS. 4A through 6B illustrate a tie down assembly 110 in accordance with another embodiment of the present invention. The tie down assembly 110 includes a cup 112, a crossbar 114, and a plurality of fasteners 116 that removably fasten the crossbar 114 to the cup 112. The tie down assembly 110 is similar in structure and function to the tie down assembly 10, with certain differences described hereinafter. More particularly, the cup 112 includes a centrally located, elongated boss member 117 extending upwardly from an interior surface 126 of a recess 124. The boss member 117 includes a centrally-located threaded counter bore 119 (see FIGS. 4B and 5D). The crossbar 114 is similar in structure and function to the crossbar 14, except that the crossbar 114 includes a centrally located, circular-shaped aperture 127 that extends through the central point 148 of the crossbar 114.

Figure 6B:
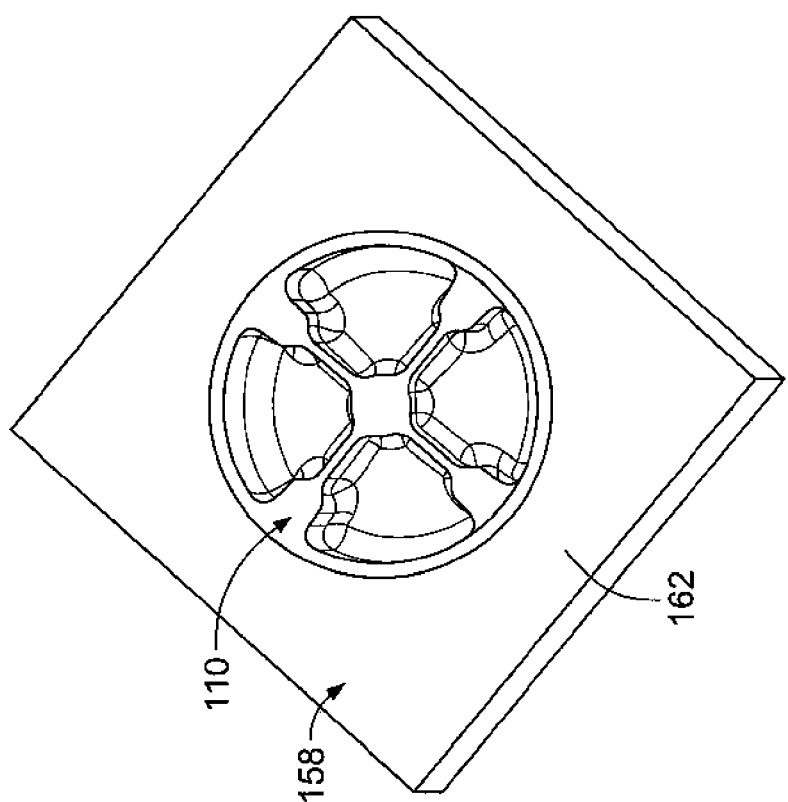
FIGS. 6A and 6B are top and bottom perspective views, respectively, of the tie down assembly shown in FIG. 4A installed within a deck of a vessel.
Figure 6A:
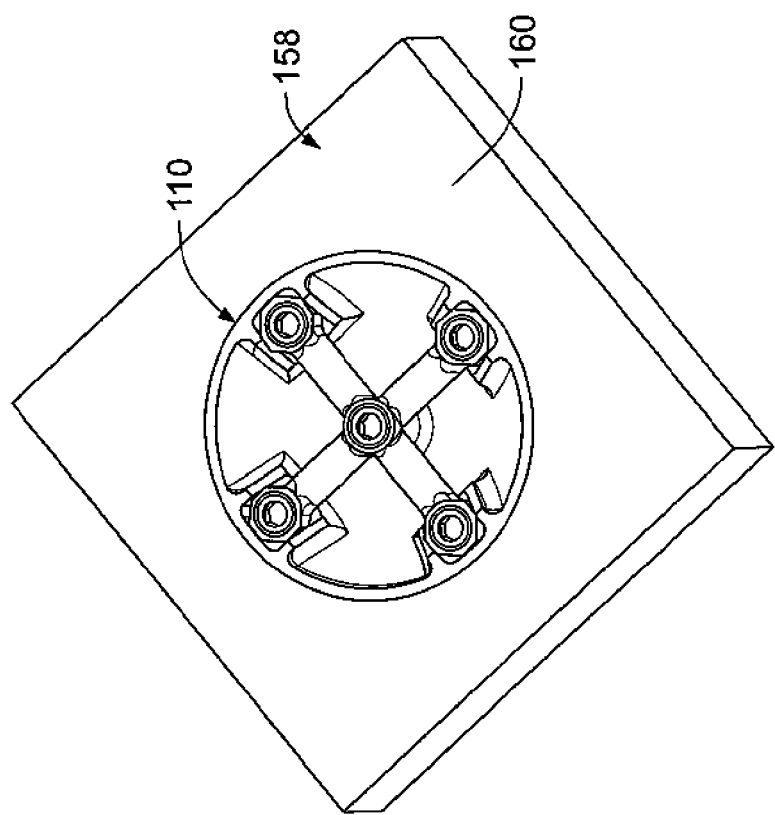
Figure 7A:
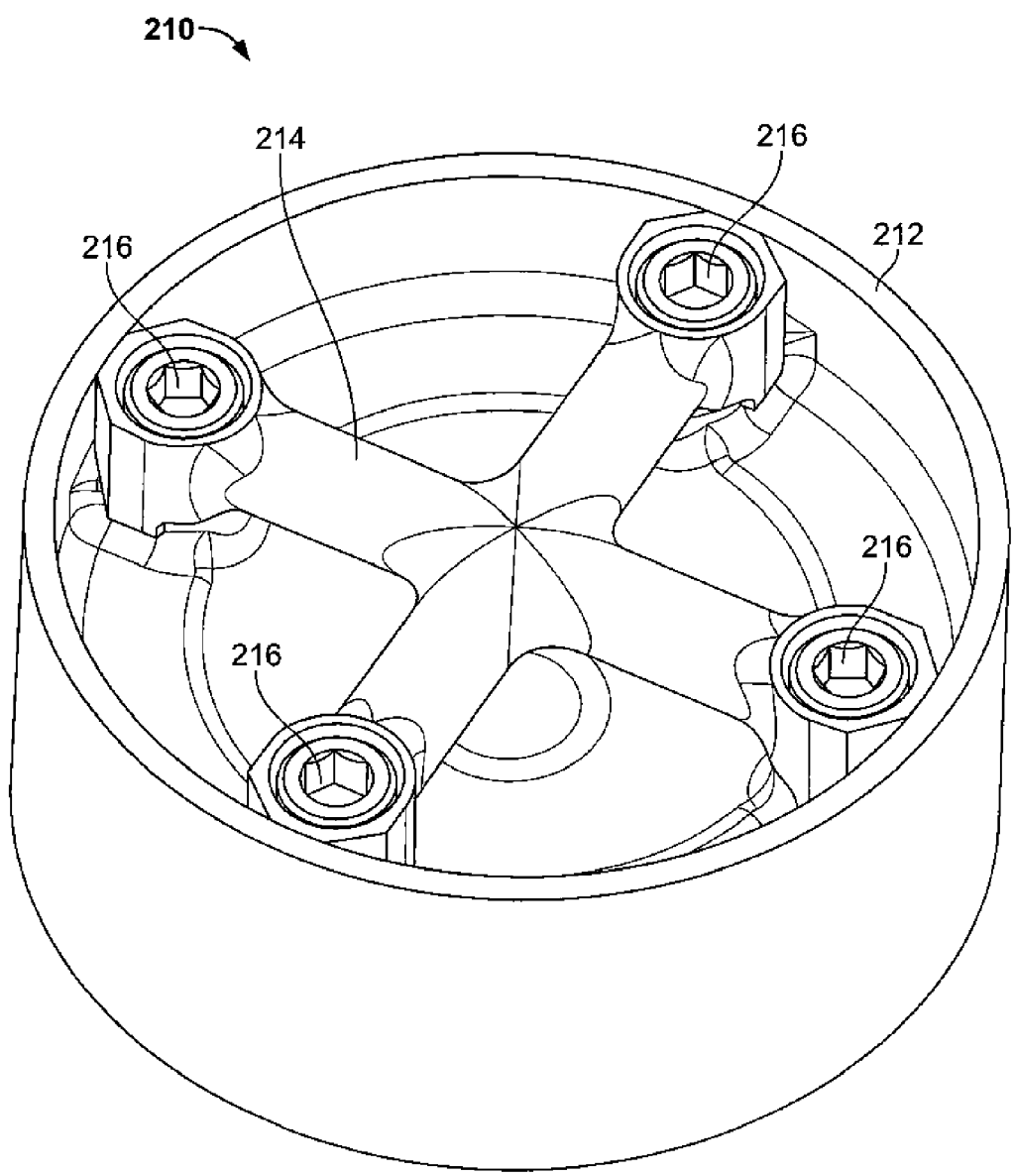
FIG. 7A is a top perspective view of a tie down assembly in accordance with another embodiment of the present invention.
Figure 7B:
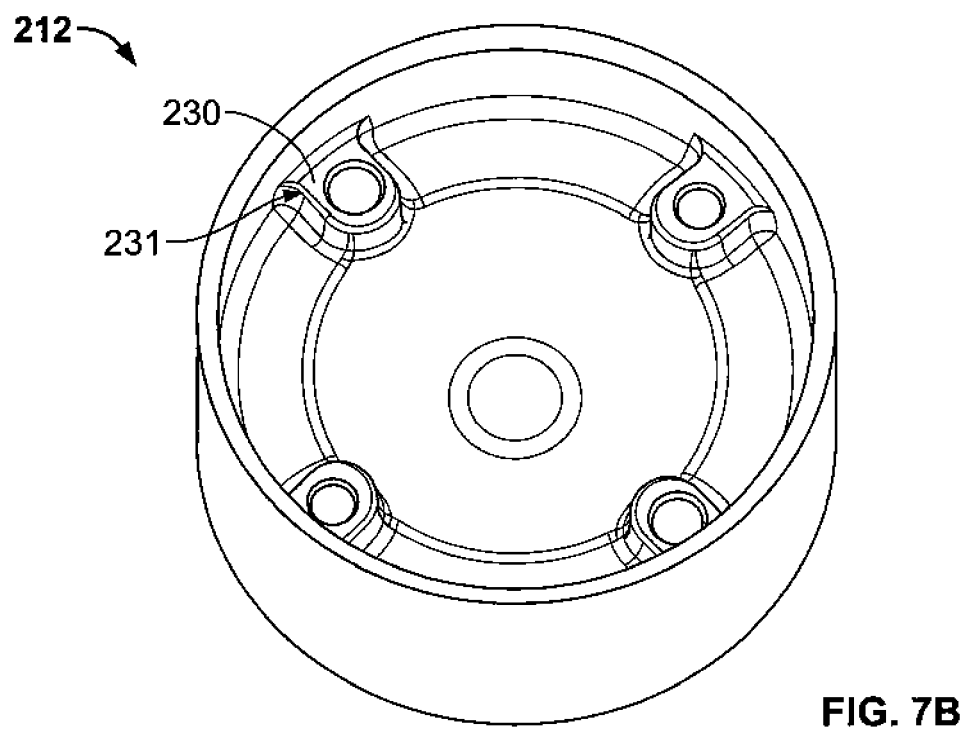
FIG. 7B is a top perspective view of a cup employed by the tie down assembly shown in FIG. 7A.
Figure 7C:
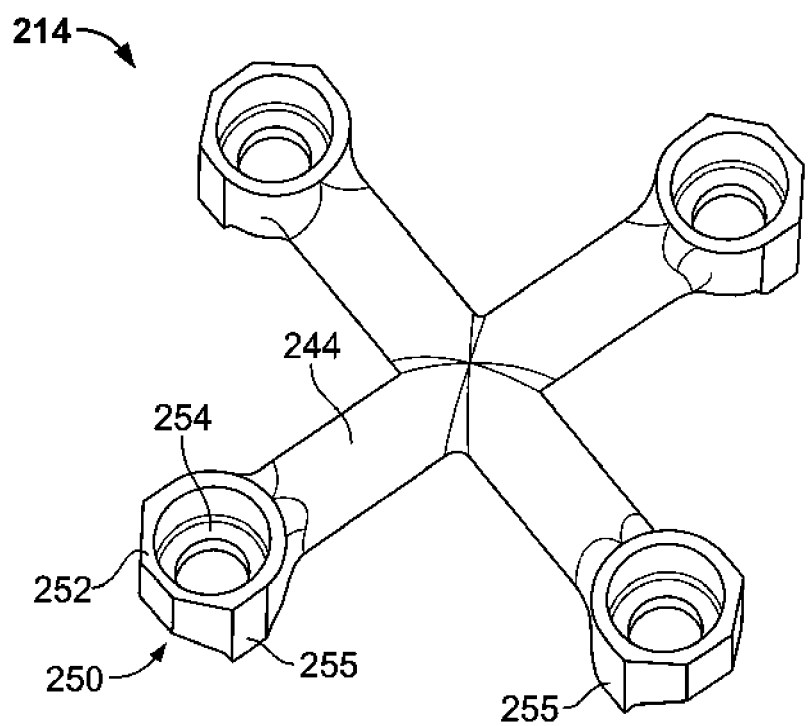
FIGS. 7C and 7D are top and bottom perspective views, respectively, of a crossbar employed by the tie down assembly shown in FIG. 7A.
Figure 7D:
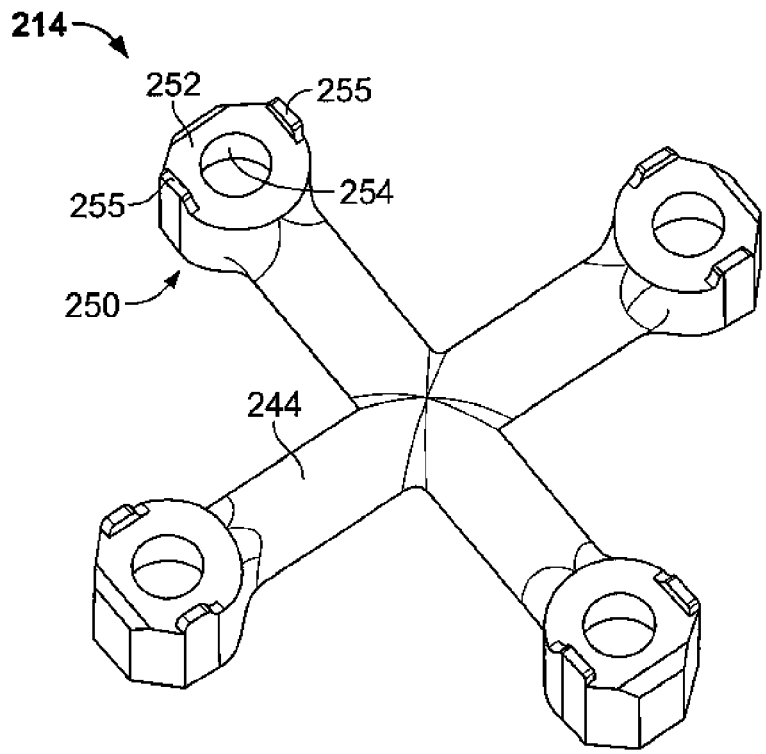
Figure 8A:
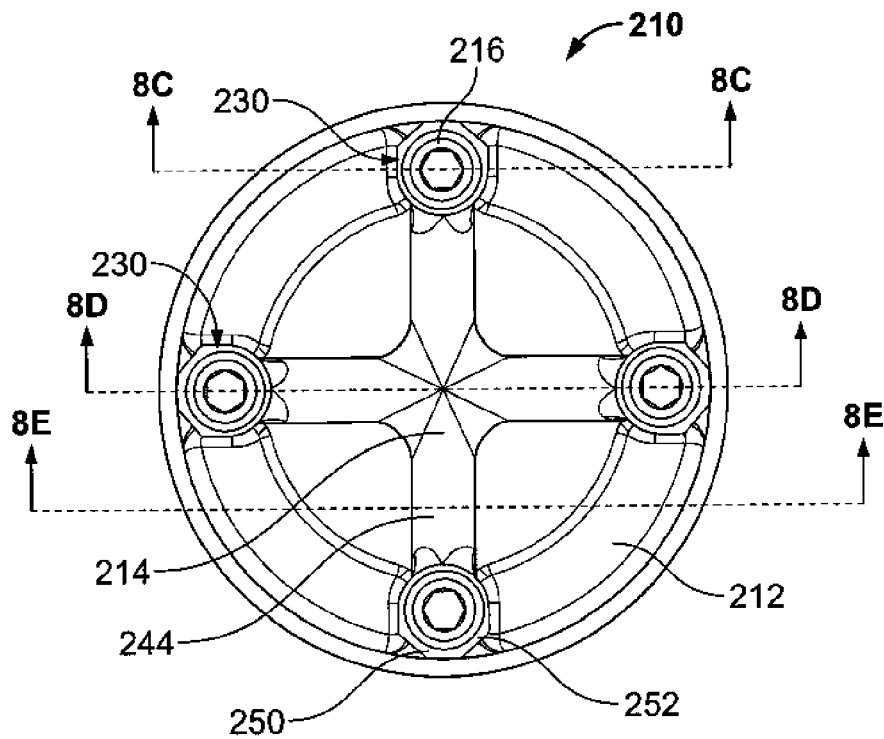
FIGS. 8A and 8B are top and bottom plan views, respectively, of the tie down assembly shown in FIG. 7A.
Figure 8B:
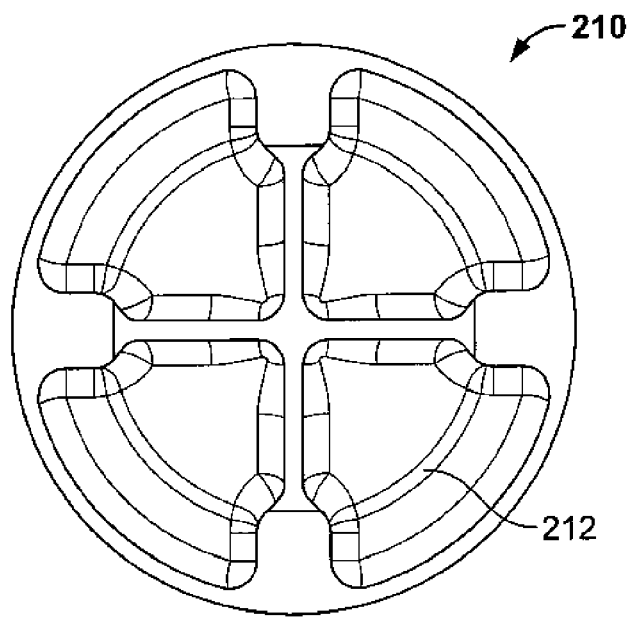
Figure 8C:
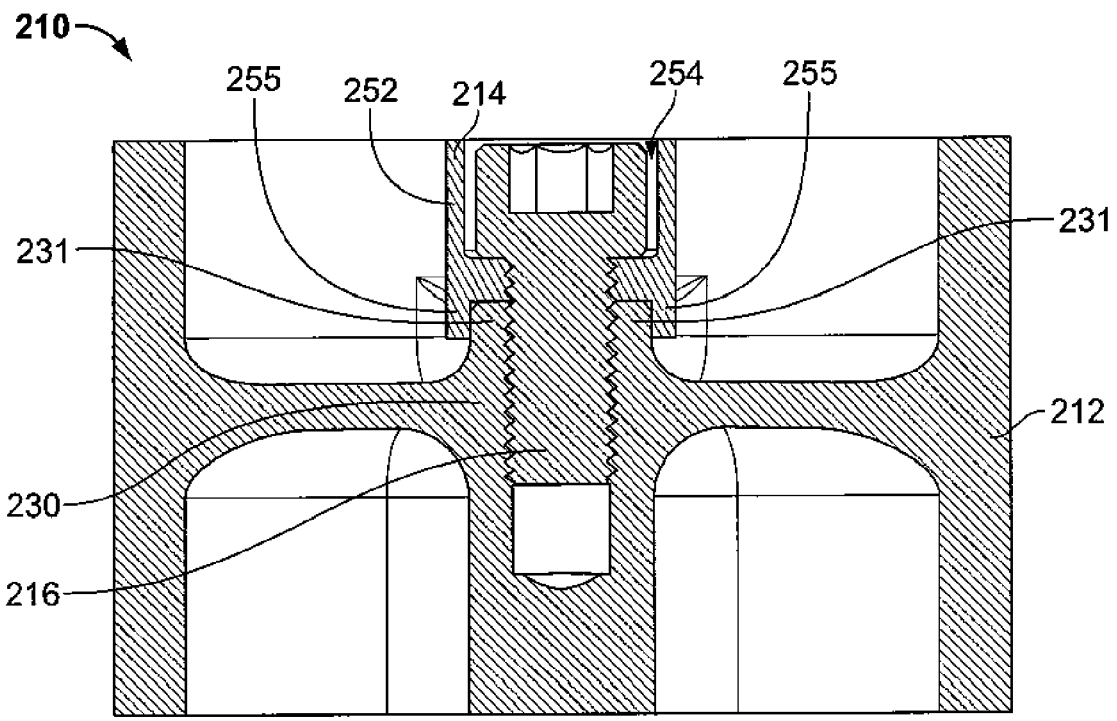
FIG. 8C is a cross-sectional view, taken along line 8C-8C and looking in the direction of the arrows, of the tie down assembly shown in FIG. 8A.
Figure 8D:
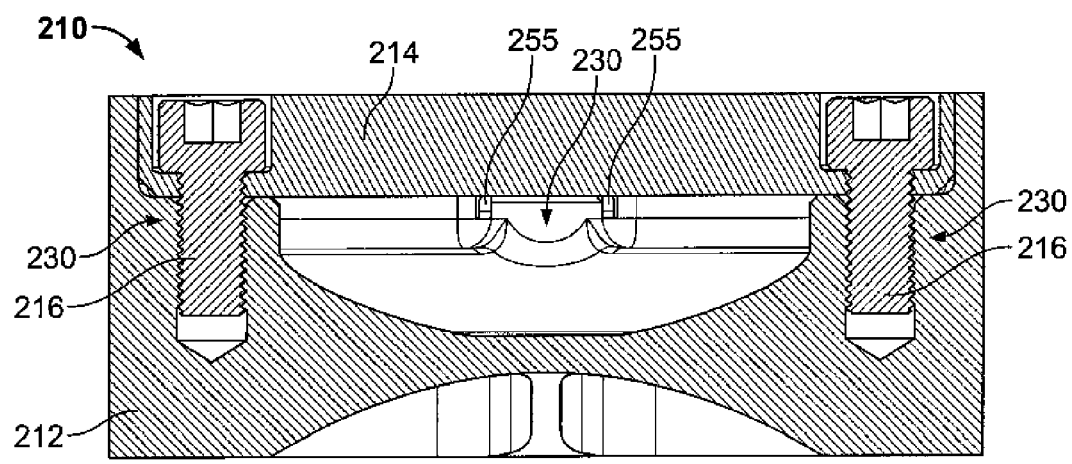
FIG. 8D is a cross-sectional view, taken along line 8D-8D and looking in the direction of the arrows, of the tie down assembly shown in FIG. 8A.
Figure 8E:
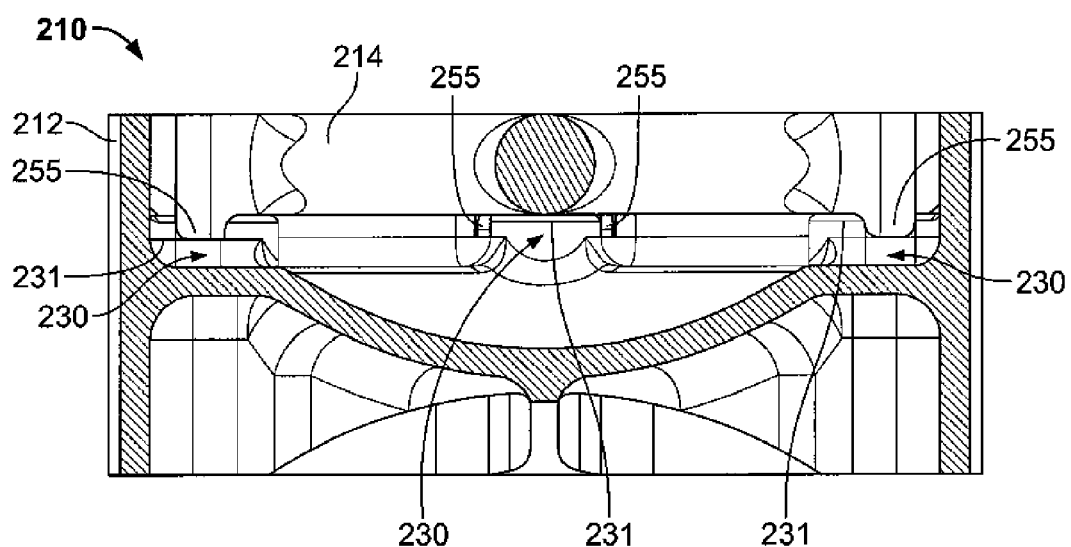
FIG. 8E is a cross-sectional view, taken along line 8E-8E and looking in the direction of the arrows, of the tie down assembly shown in FIG. 8A.

Referring to FIGS. 4A through 5E, the crossbar 114 is fastened to the cup 112 by the fasteners 116 in the same manner as described above for the tie down assembly 10, with the addition that the central portion 148 of the crossbar 114 is attached to the boss member 117 of the cup 112 by one of the fasteners 116. This additional attachment point provides greater strength for the crossbar 114. Referring to FIGS. 6A and 6B, the tie down assembly 110 is secured to a deck 158 of a vessel having an exterior surface 160 and an interior surface 162. The tie down assembly 110 is installed to the deck 158 in a manner similar to the tie down assembly 10 as described above.

FIGS. 7A through 9B illustrate a tie down assembly 210 in accordance with another embodiment of the present invention. The tie down assembly 210 includes a cup 212, a crossbar 214, and a plurality of fasteners 216 that fasten the crossbar 214 to the cup 212. The tie down assembly 210 is similar in structure and function to the tie down assembly 10, with certain differences described hereinafter. More particularly, the cup 212 includes a plurality of seats 230, each of which includes a raised portion 231 extending upwardly therefrom. The crossbar 214 is similar in structure and function to the crossbar 14, except that the crossbar 214 includes a plurality of members 244, each of which includes a hexagonal-shaped head 252 formed at a free end 250 thereof, a centrally located, circular-shaped aperture 254 extending through the head 252, and a pair of opposed tabs 255 that extend downwardly from the head 252 (see FIG. 8C). Referring to FIGS. 7A through 8E, the crossbar 214 is fastened to the cup 212 by the fasteners 216 in the same manner as described above for the tie down assembly 10, with the addition that the each pair of the tabs 255 of the crossbar 214 is fitted around a corresponding one of the raised portions 231 of the cup 212. As a result, the engagement between the tabs 255 of the crossbar 214 and the raised portions 231 of the cup 212 inhibits rotation of the crossbar 214 relative to the cup 212. Referring to FIGS. 9A and 9B, the tie down assembly 210 is secured to a deck 258 of a vessel having an exterior surface 260 and an interior surface 262. The tie down assembly 210 is installed to the deck 258 in a manner similar to the tie down assembly 10 as described above.

Figure 10A:
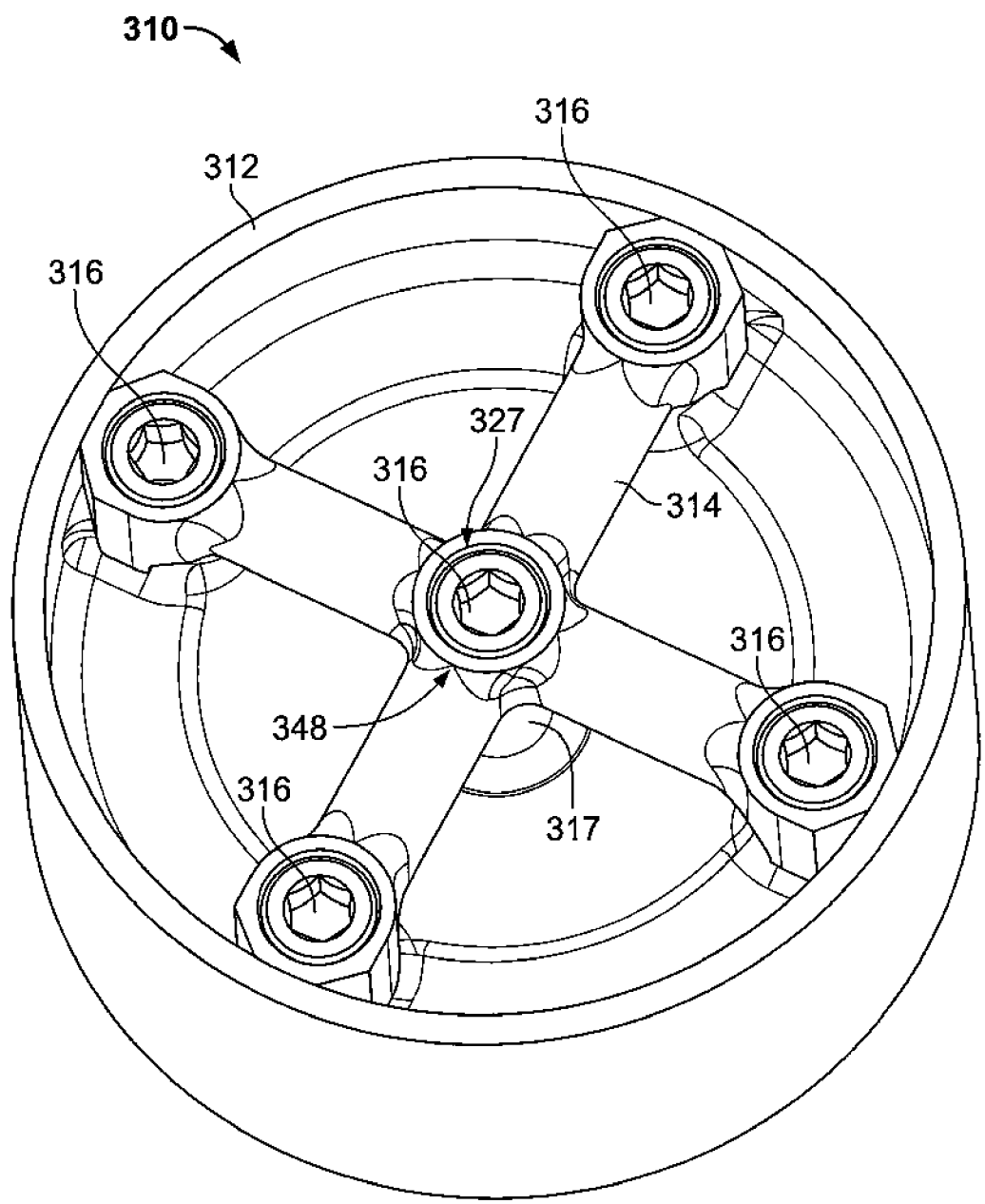
FIG. 10A is a top perspective view of a tie down assembly in accordance with another embodiment of the present invention.
Figure 10B:
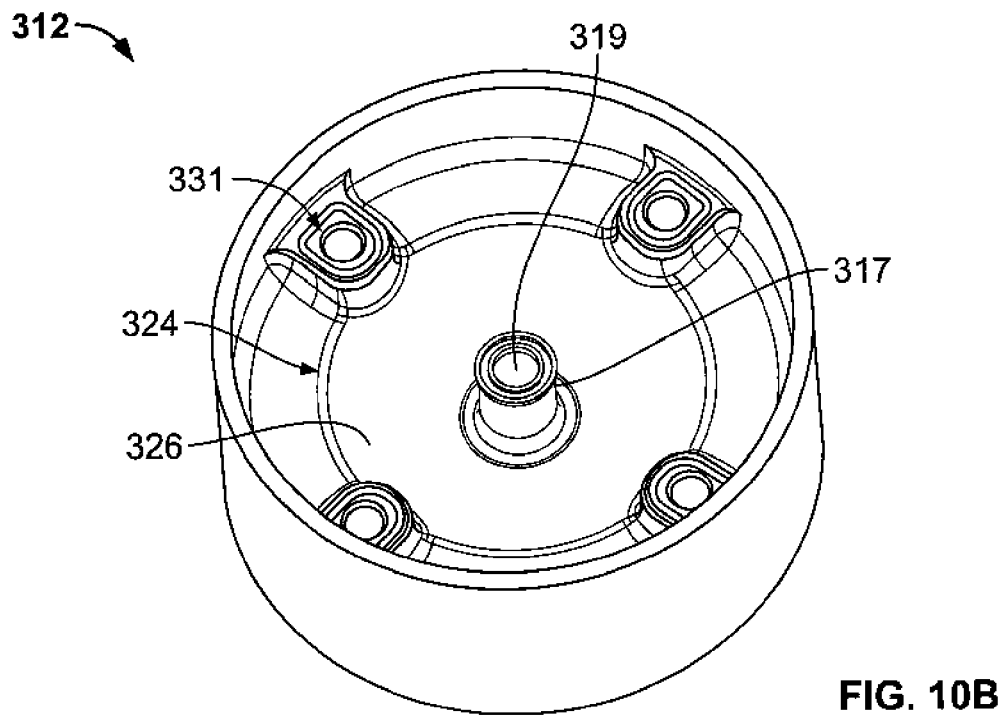
FIG. 10B is a top perspective view of a cup employed by the tie down assembly shown in FIG. 10A.
Figure 10C:
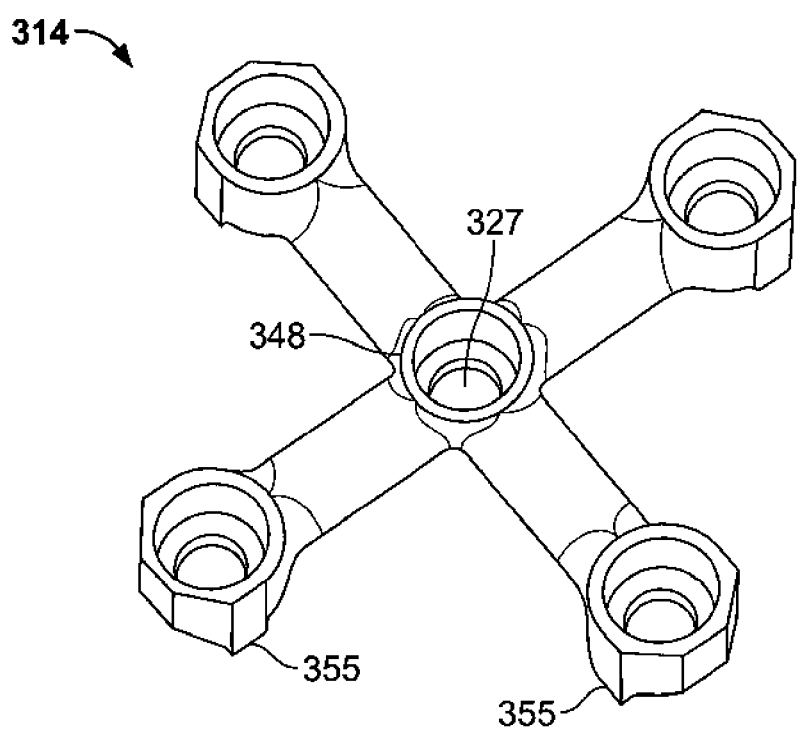
FIGS. 10C and 10D are top and bottom perspective views, respectively, of a crossbar employed by the tie down assembly shown in FIG. 10A.
Figure 10D:
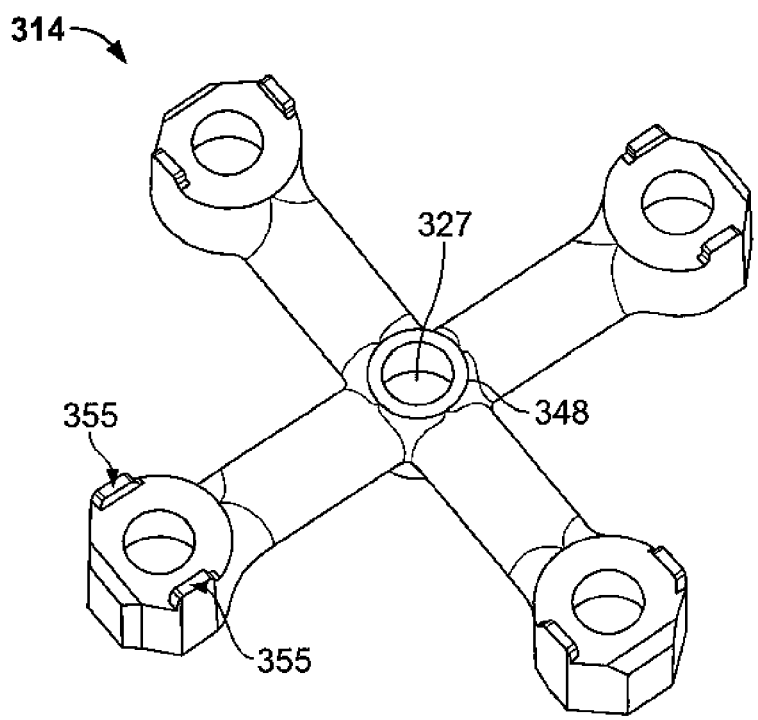
Figure 11A:
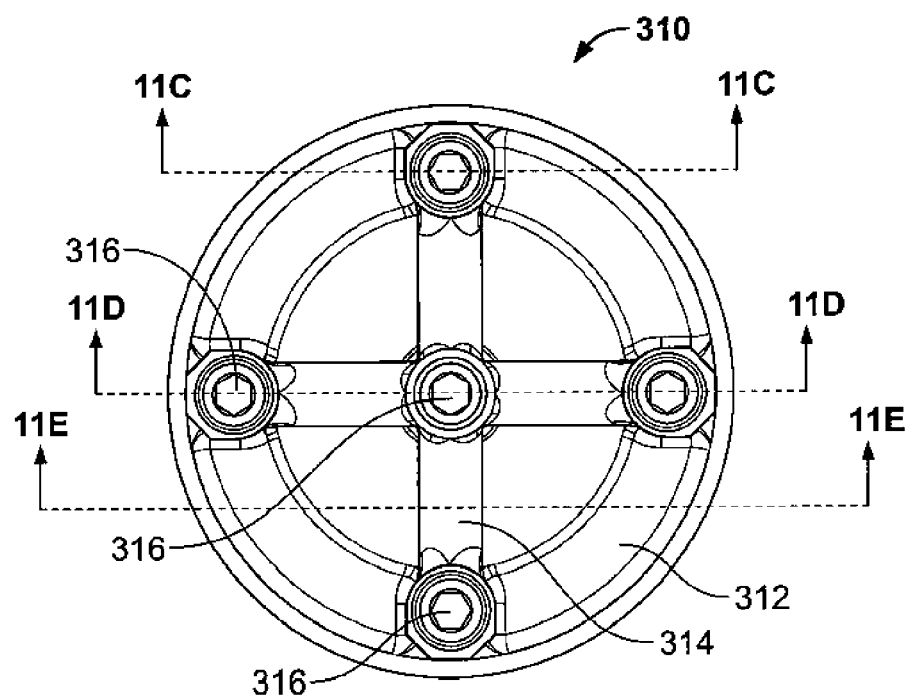
FIGS. 11A and 11B are top and bottom plan views, respectively, of the tie down assembly shown in FIG. 10A.
Figure 11B:
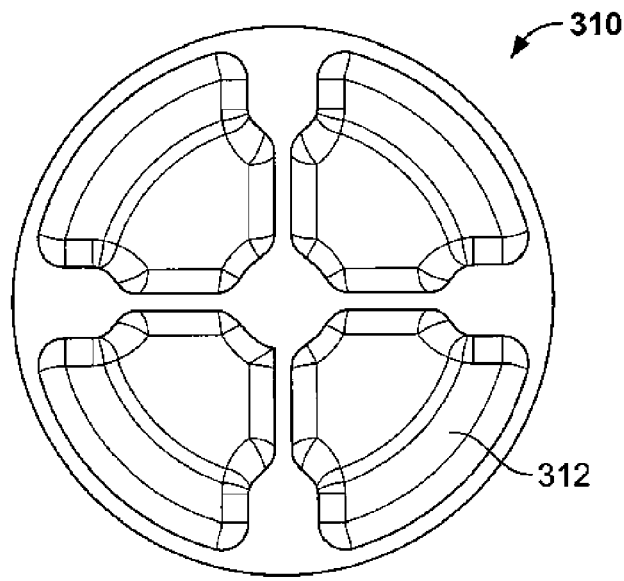
Figure 11C:
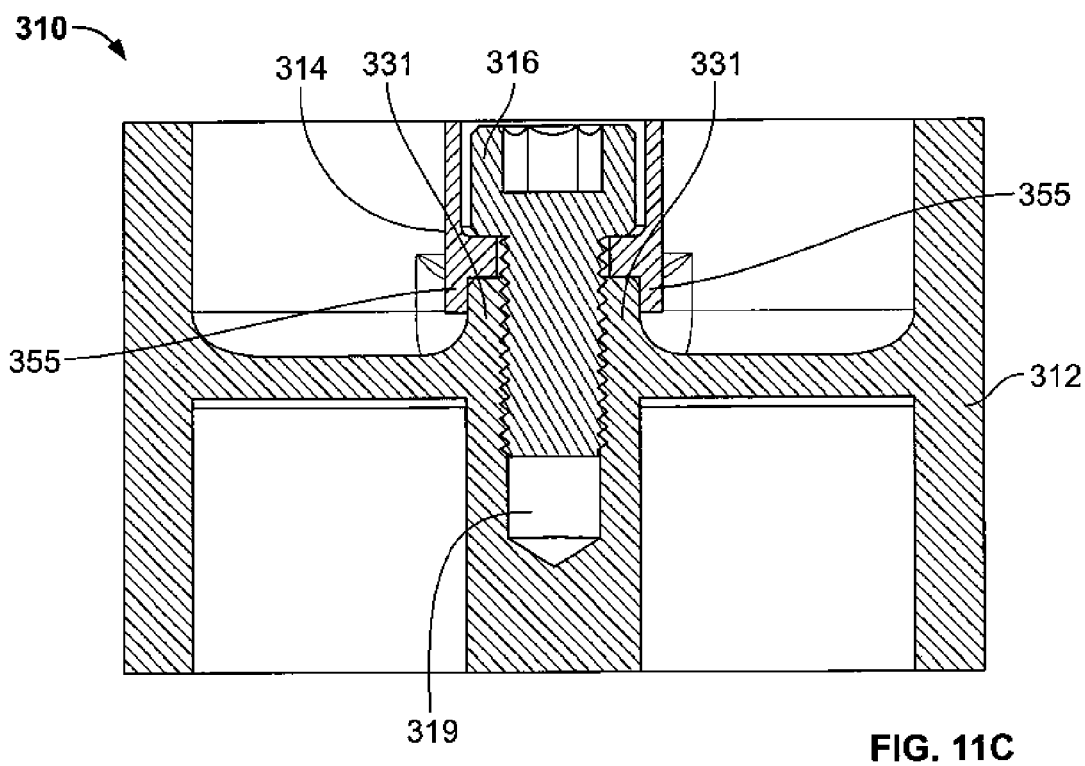
FIG. 11C is a cross-sectional view, taken along line 11C-11C and looking in the direction of the arrows, of the tie down assembly shown in FIG. 11A.
Figure 11D:
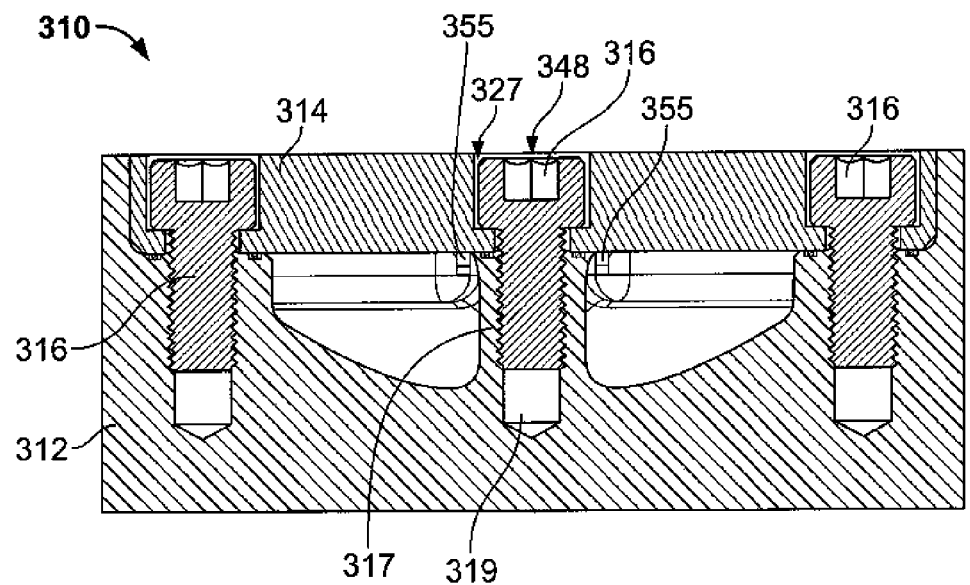
FIG. 11D is a cross-sectional view, taken along line 11D-11D and looking in the direction of the arrows, of the tie down assembly shown in FIG. 11A.
Figure 11E:
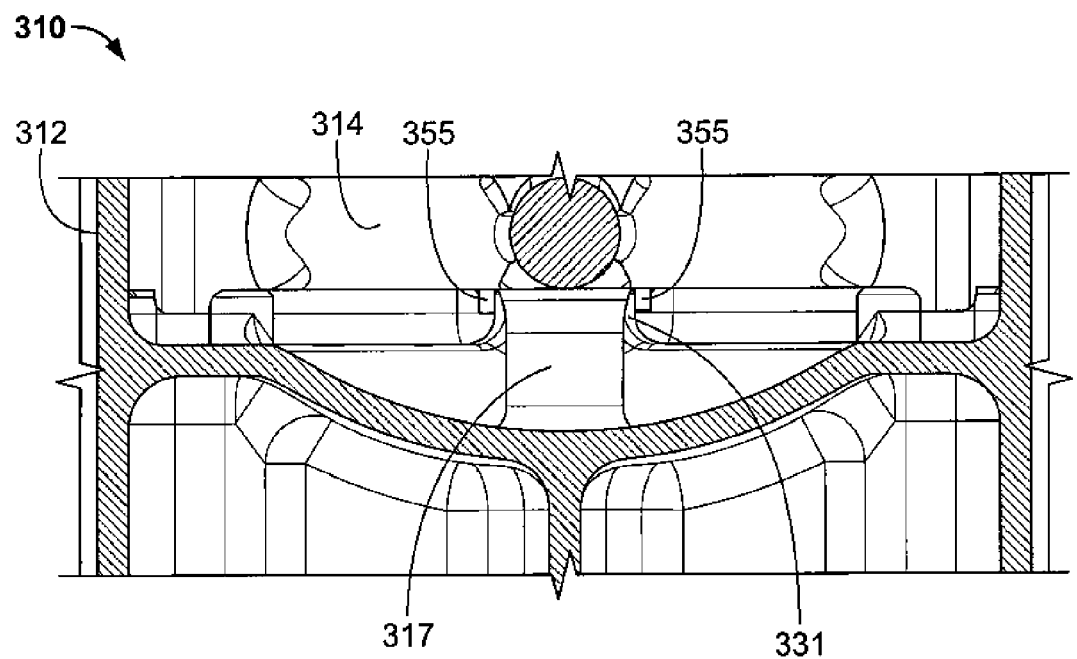
FIG. 11E is a cross-sectional view, taken along line 11E-11E and looking in the direction of the arrows, of the tie down assembly shown in FIG. 11A.
Figure 12B:
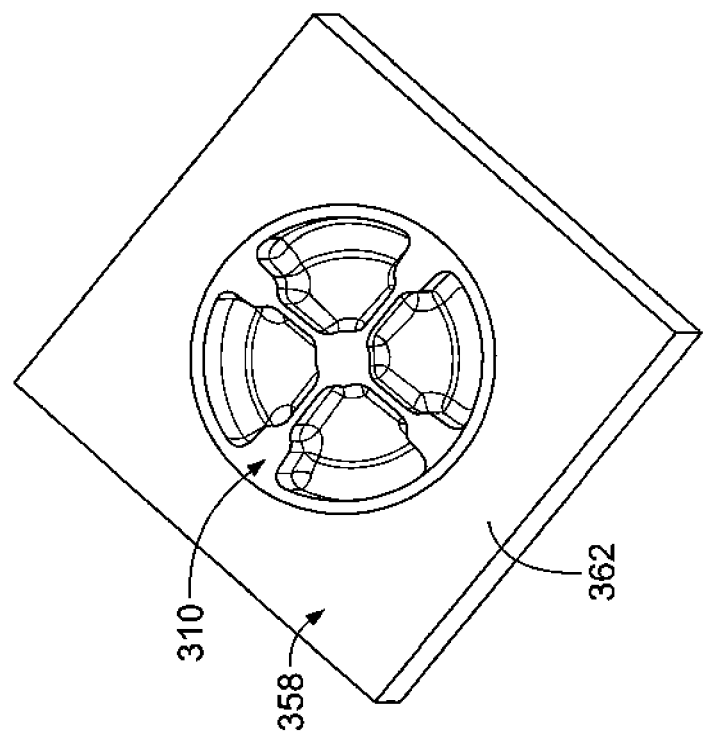
FIGS. 12A and 12B are top and bottom perspective views, respectively, of the tie down assembly shown in FIG. 10A installed within a deck of a vessel.
Figure 12A:
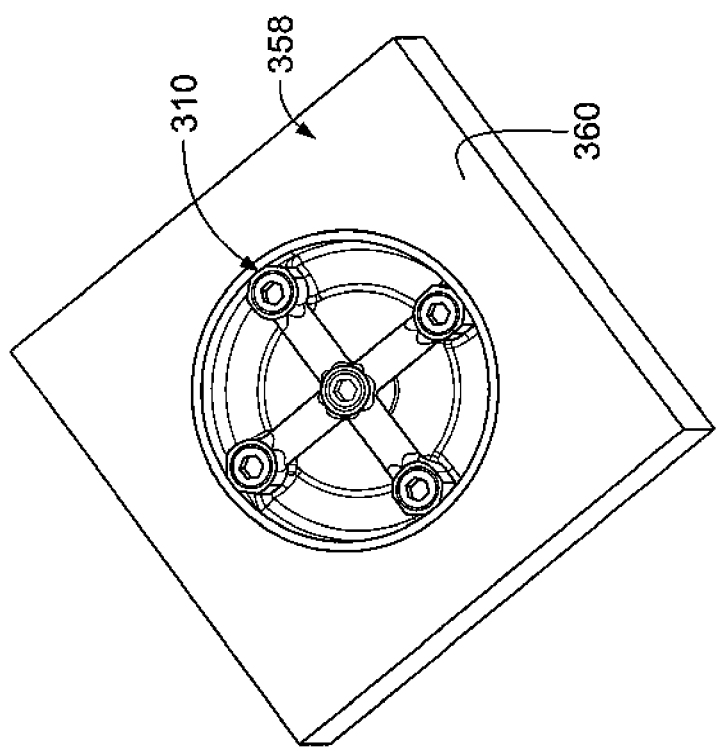
Figure 13A:
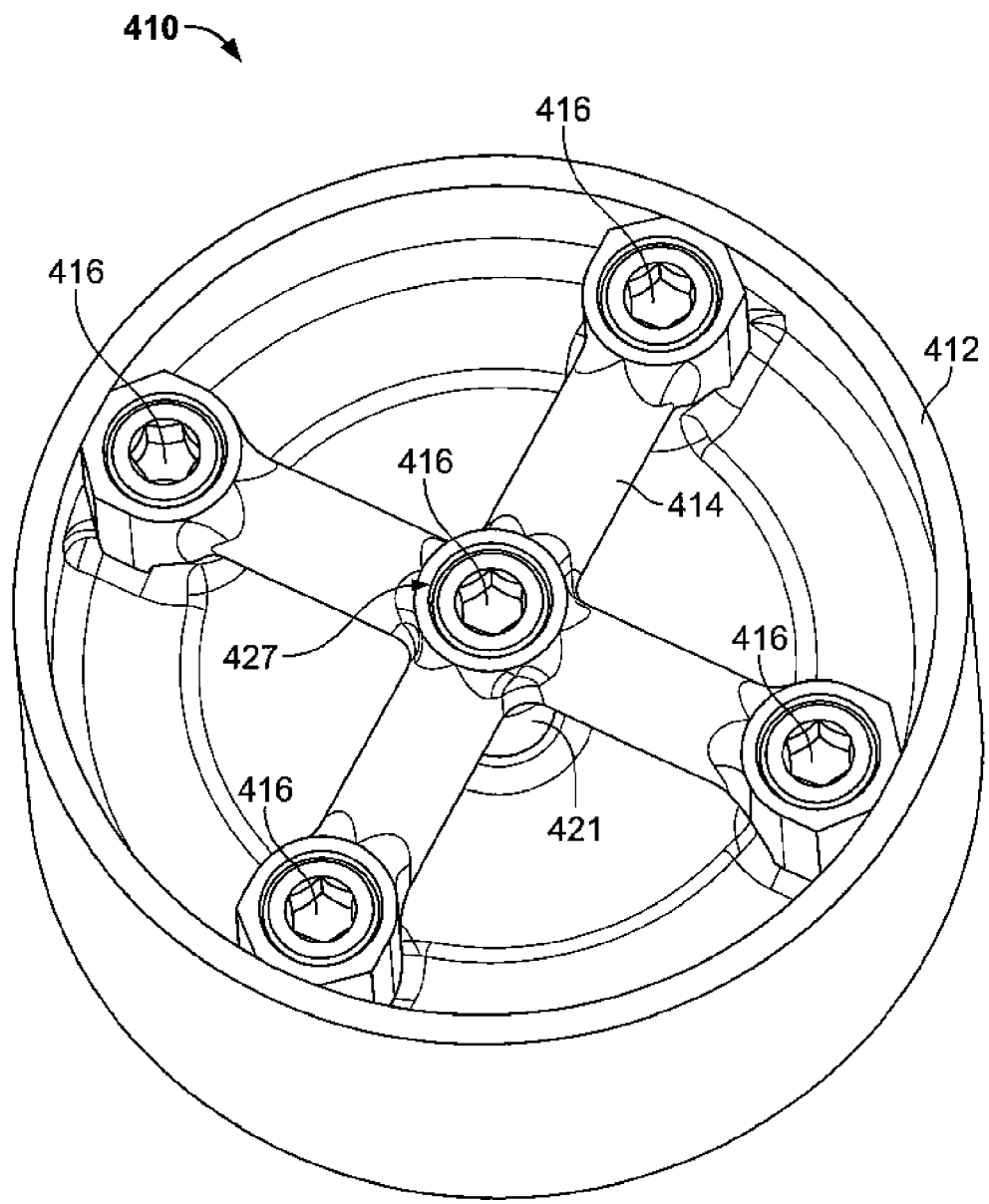
FIG. 13A is a top perspective view of a tie down assembly in accordance with another embodiment of the present invention.
Figure 13B:
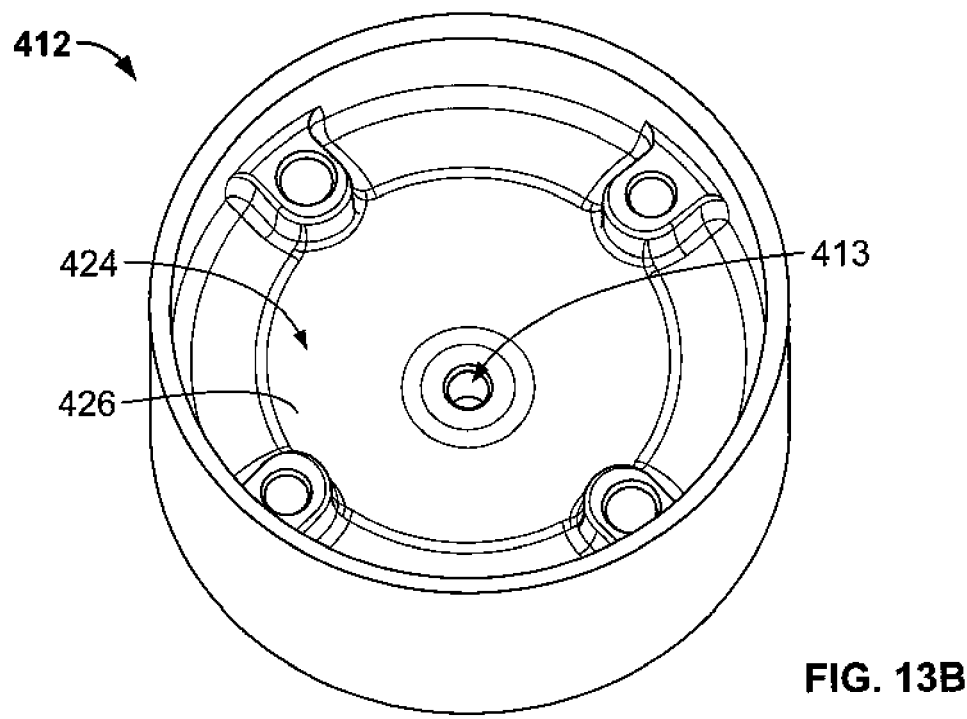
FIG. 13B is a top perspective view of a cup employed by the tie down assembly shown in FIG. 13A.
Figure 13C:
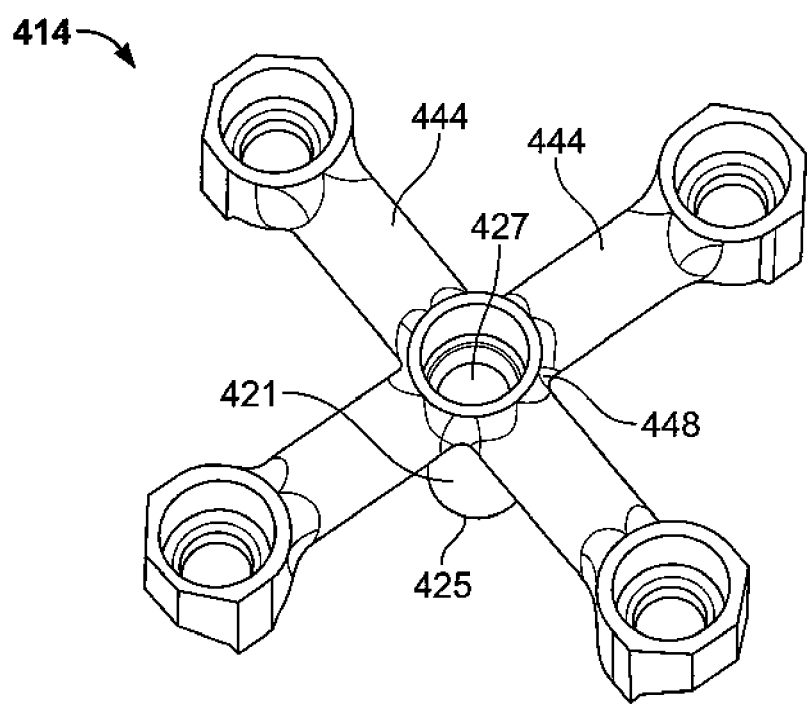
FIGS. 13C and 13D are top and bottom perspective views, respectively, of a crossbar employed by the tie down assembly shown in FIG. 13A.
Figure 13D:
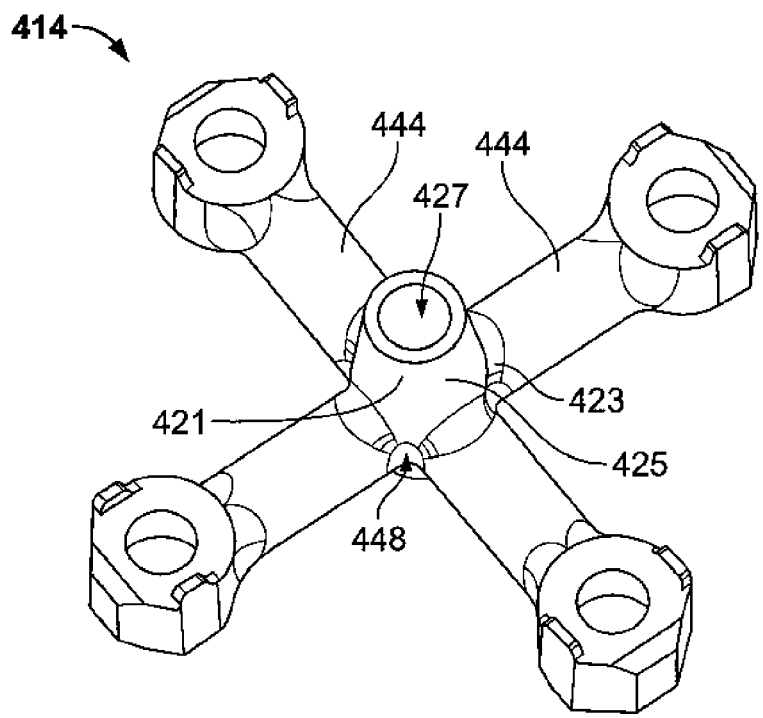
Figure 14A:
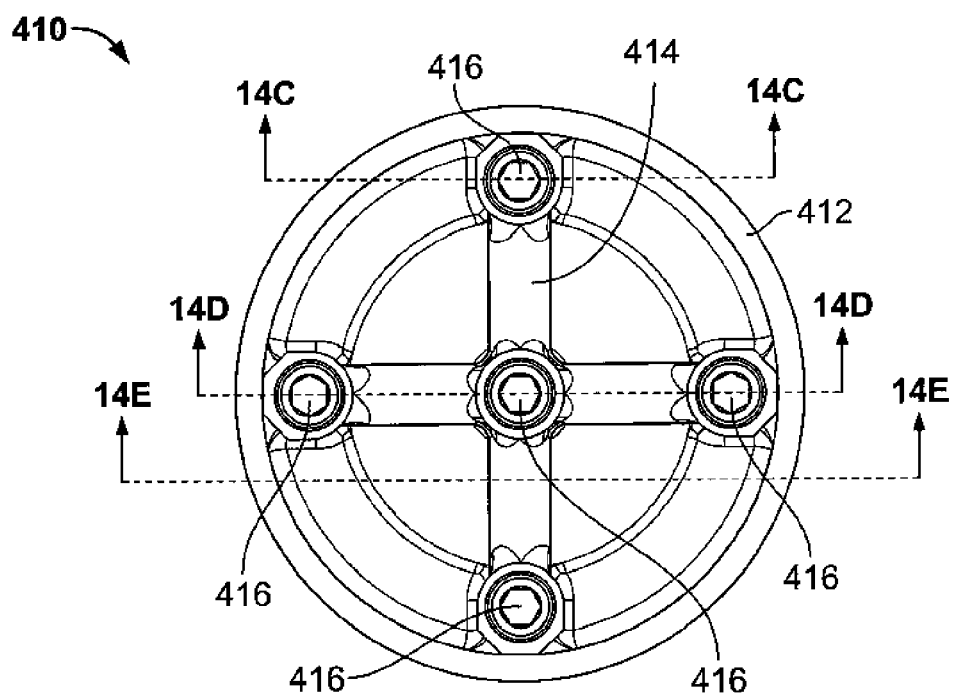
FIGS. 14A and 14B are top and bottom plan views, respectively, of the tie down assembly shown in FIG. 13A.
Figure 14B:
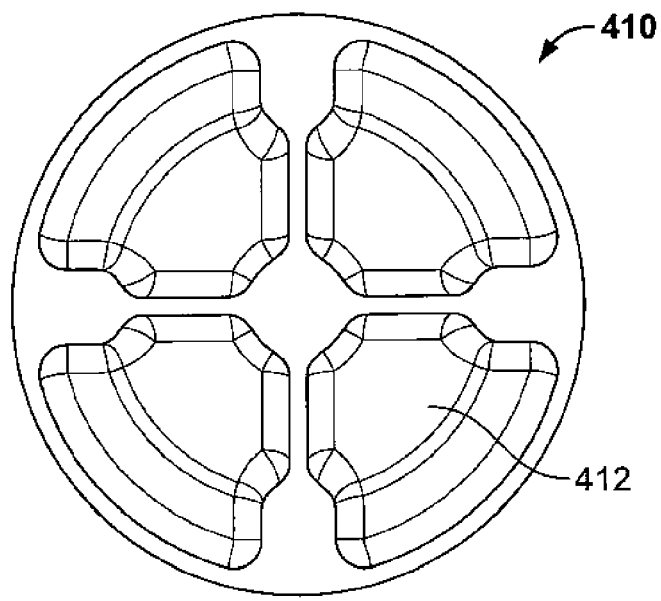
Figure 14C:
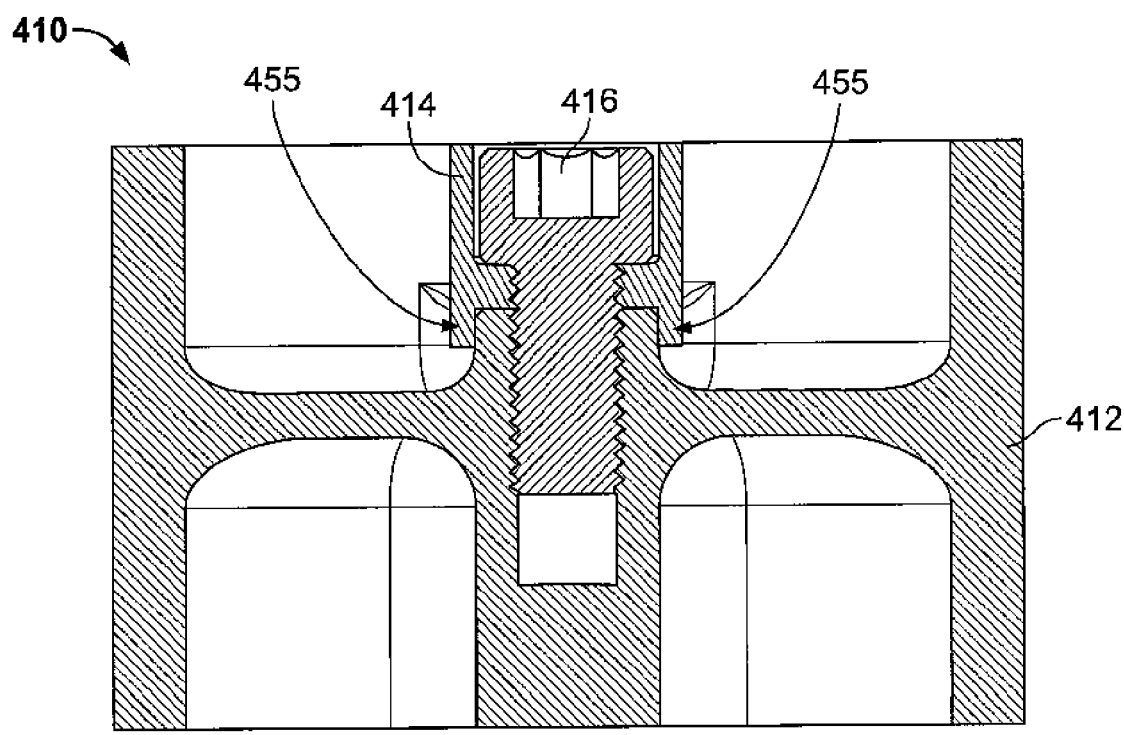
FIG. 14C is a cross-sectional view, taken along line 14C-14C and looking in the direction of the arrows, of the tie down assembly shown in FIG. 14A.
Figure 14D:
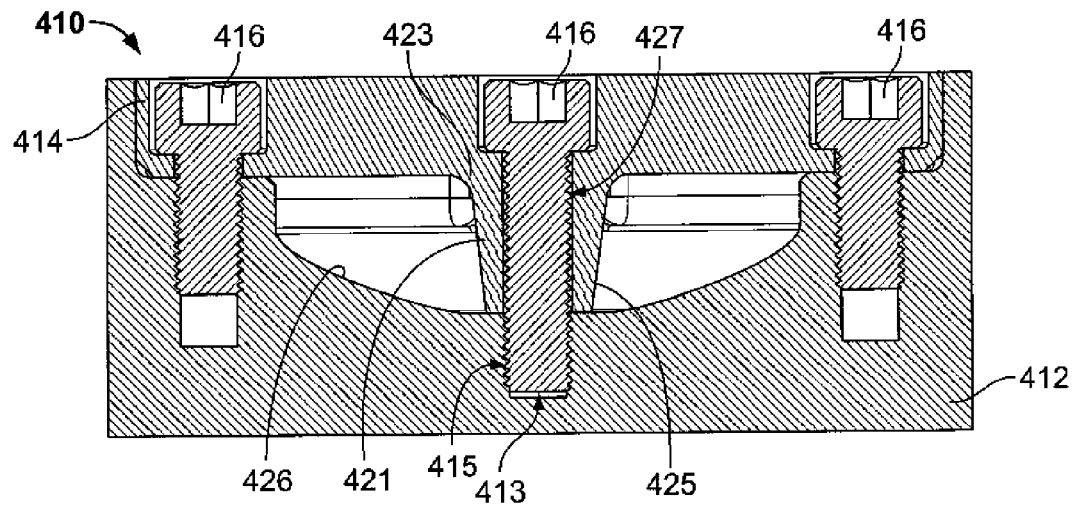
FIG. 14D is a cross-sectional view, taken along line 14D-14D and looking in the direction of the arrows, of the tie down assembly shown in FIG. 14A.
Figure 14E:
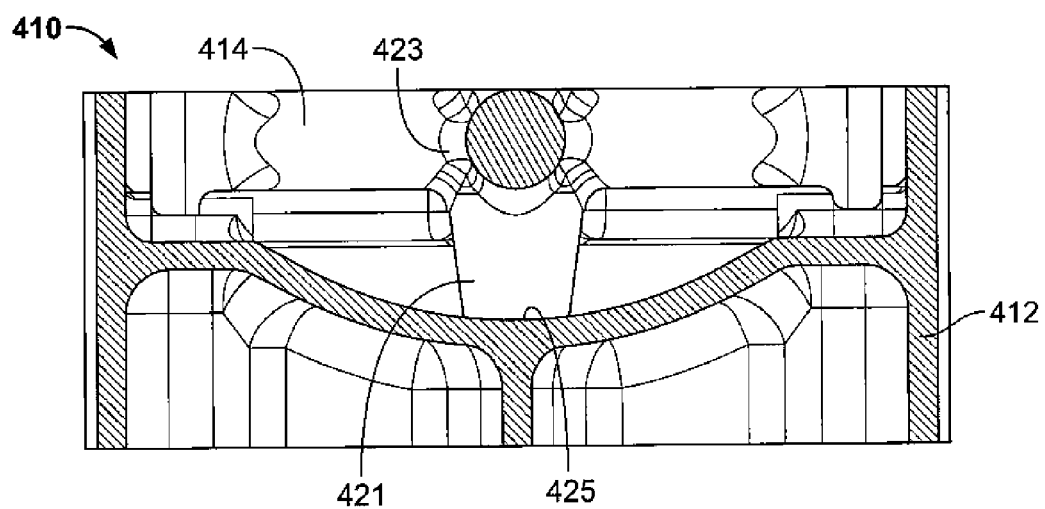
FIG. 14E is a cross-sectional view, taken along line 14E-14E and looking in the direction of the arrows, of the tie down assembly shown in FIG. 14A.

FIGS. 10A though 12B illustrate a tie down assembly 310 in accordance with another embodiment of the present invention. The tie down assembly 310 includes a cup 312, a crossbar 314, and a plurality of fasteners 316 that removably fasten the crossbar 314 to the cup 312. The tie down assembly 310 is similar in structure and function to the tie down assemblies 110 and 210, with certain differences as described below. More particularly, the cup 312 includes a centrally located, elongated boss member 317 extending upwardly from an interior surface 326 of a recess 324. The boss member 317 includes a centrally-located threaded aperture 319. The crossbar 314 is similar in structure and function to the crossbar 214, except that the crossbar 314 includes a centrally located, circular-shaped aperture 327 that extends through the central point 348. In an embodiment, the aperture 327 includes internal threads (not shown in the Figures) that threadedly engage a fastener 316. Referring to FIGS. 10A through 10E, the crossbar 314 is fastened to the cup 312 by the fasteners 316 in the same manner as described above for the tie down assembly 210, with the addition that the central portion 348 of the crossbar 314 is attached to the boss member 317 of the cup 312 by one of the fasteners 316. This additional attachment point provides greater strength for the crossbar 314. Moreover, each pair of tabs 355 of the crossbar 314 is fitted around a corresponding one of raised portions 331 of the cup 312. As a result, the engagement between the tabs 355 of the crossbar 314 and the raised portions 331 of the cup 312 inhibits rotation of the crossbar 314 relative to the cup 312. Referring to FIGS. 12A and 12B, the tie down assembly 310 is secured to a deck 358 of a vessel having an exterior surface 360 and an interior surface 362. The tie down assembly 310 is installed to the deck 358 in a manner similar to the tie down assembly 10 as described above.

FIGS. 13A to 15B illustrate a tie down assembly 410 in accordance with another embodiment of the present invention. The tie down assembly 410 includes a cup 412, a crossbar 414, and a plurality of fasteners 416 that removably fasten the crossbar 414 to the cup 412. The tie down assembly 410 is similar in structure and function to the tie down assembly 310, with certain differences as described below. More particularly, the cup 312 includes a centrally located aperture 413 formed within an interior surface 426 of a recess 424 (see FIGS. 13B and 14D). In an embodiment, the aperture 413 includes internal threads 415 (see FIG. 14D). The crossbar 414 is similar in structure and function to the crossbar 314, except that the crossbar 414 includes a centrally located stem 421 that extends perpendicularly from members 444 at a central point 448. The stem 421 has a first end 423 connected to the central point 448 and a free end 425 opposite to the first end 423. In an embodiment, the stem 421 is tubular shaped. In another embodiment, the stem 421 is conical shaped. A centrally located, circular-shaped aperture 427 extends through the central point 448 of the crossbar 444 to the free end 423 of the stem 421.

Figure 15B:
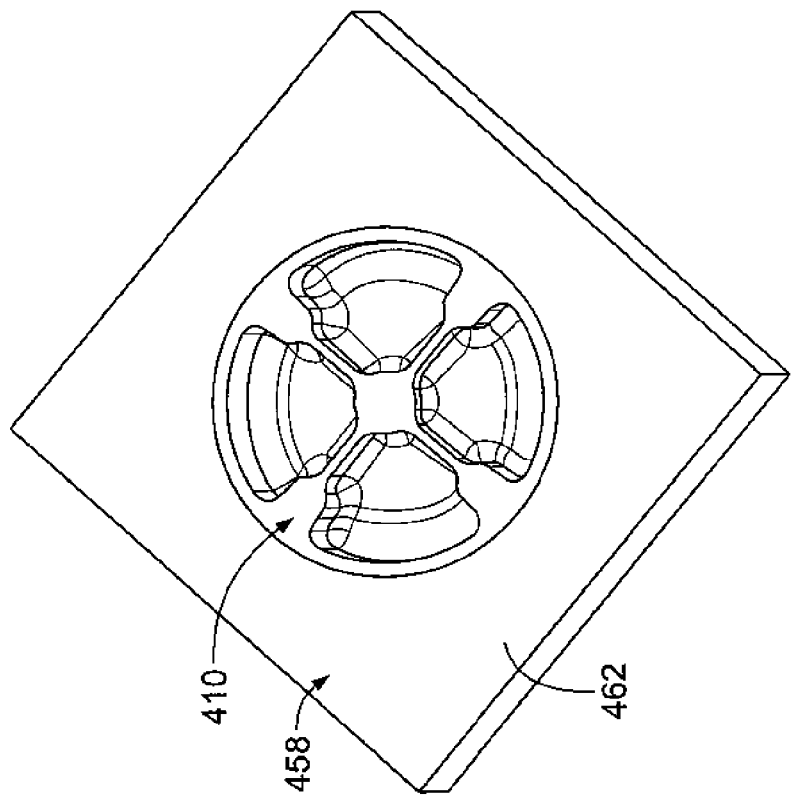
FIGS. 15A and 15B are top and bottom perspective views, respectively, of the tie down assembly shown in FIG. 13A installed within a deck of a vessel.
Figure 15A:
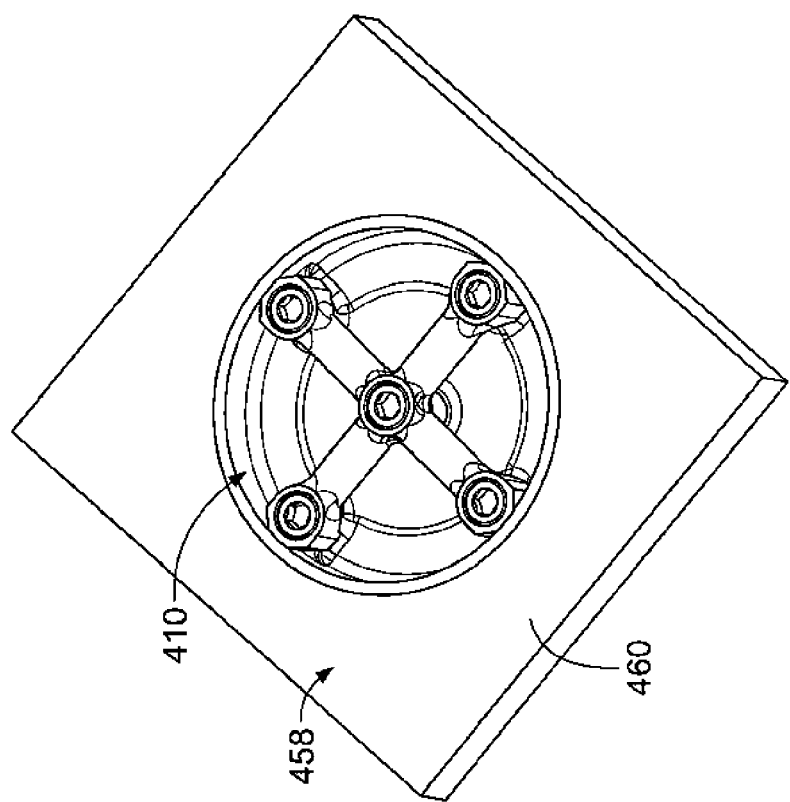

Referring to FIGS. 14A through 14E, the crossbar 414 is fastened to the cup 412 by the fasteners 416 in the same manner as described above for the tie down assembly 310, with the addition that the stem 421 of the crossbar 414 is attached to the interior surface 426 of the cup 412 by one of the fasteners 416, which threadedly engages and the threads 415 of the aperture 413 of the cup 412. This additional attachment point provides greater strength to the crossbar 414. Referring to FIGS. 15A and 15B, the tie down assembly 410 is secured to a deck 458 of a vessel having an exterior surface 460 and an interior surface 462. The tie down assembly 410 is installed to the deck 458 in a manner similar to the tie down assembly 10 as described above.

FIGS. 16A to 16G illustrate a tie down assembly 510 in accordance with another embodiment of the present invention. The tie down assembly 510 includes a cup 512, a crossbar 514, and a plurality of fasteners 516 that removably fasten the crossbar 514 to the cup 512. The tie down assembly 510 is similar in structure and function to the tie down assembly 110, with certain differences as described below. More particularly, referring to FIGS. 16B through 16D, the cup 512 includes an upper end 518 and a lower end 520 that is opposite the upper end 518, and a ring-shaped sidewall 522 that extends from the upper end 518 to the lower end 520 (see FIG. 16B). In an embodiment, the cup 512 includes a circular-shaped flange 511 extending outwardly from the sidewall 522 proximate to the lower end 520 (see FIG. 16B). In an embodiment, the flange 511 need not be included.

Figure 16A:
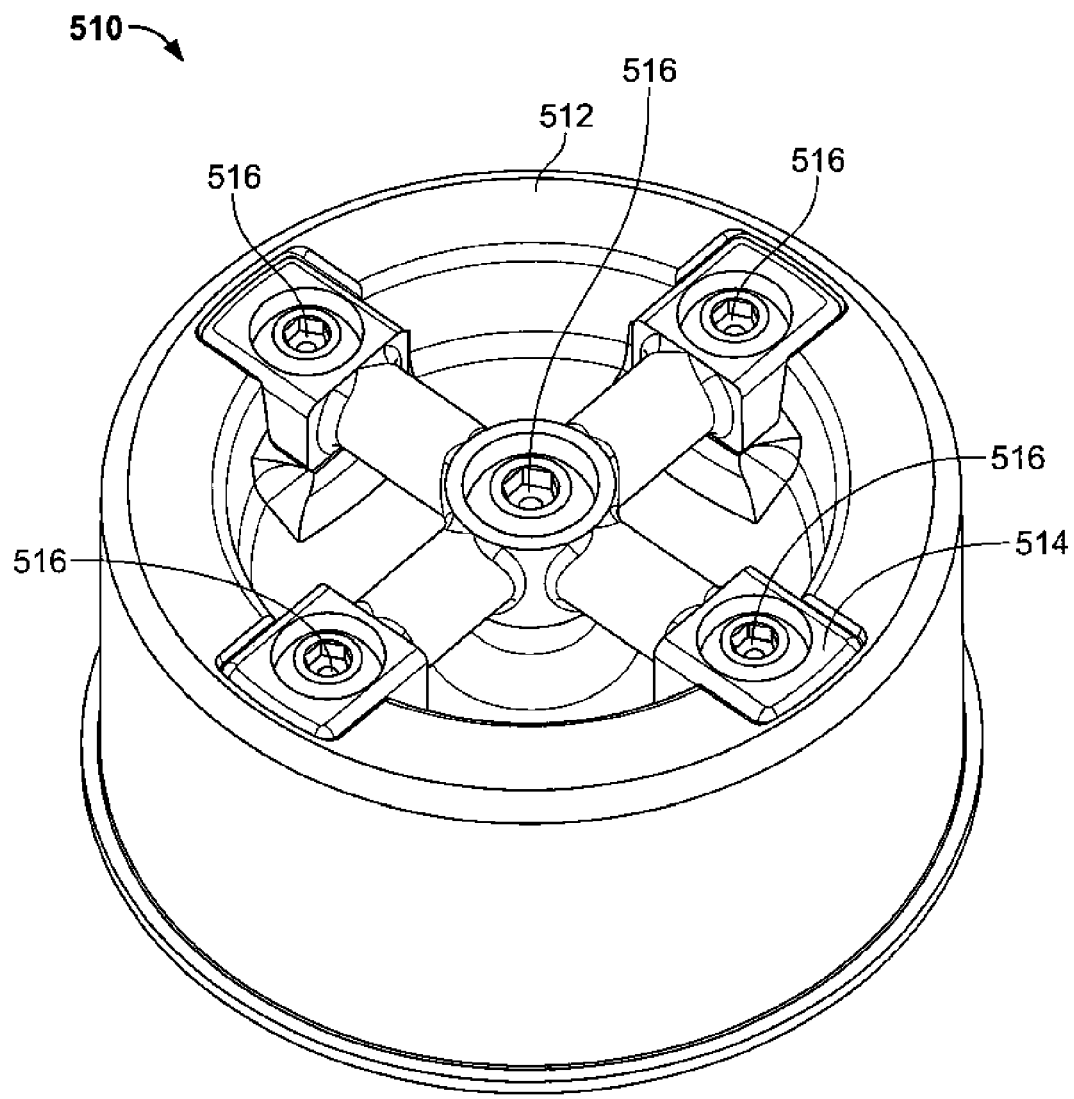
FIG. 16A is a top perspective view of a tie down assembly in accordance with another embodiment of the present invention.
Figure 16B:
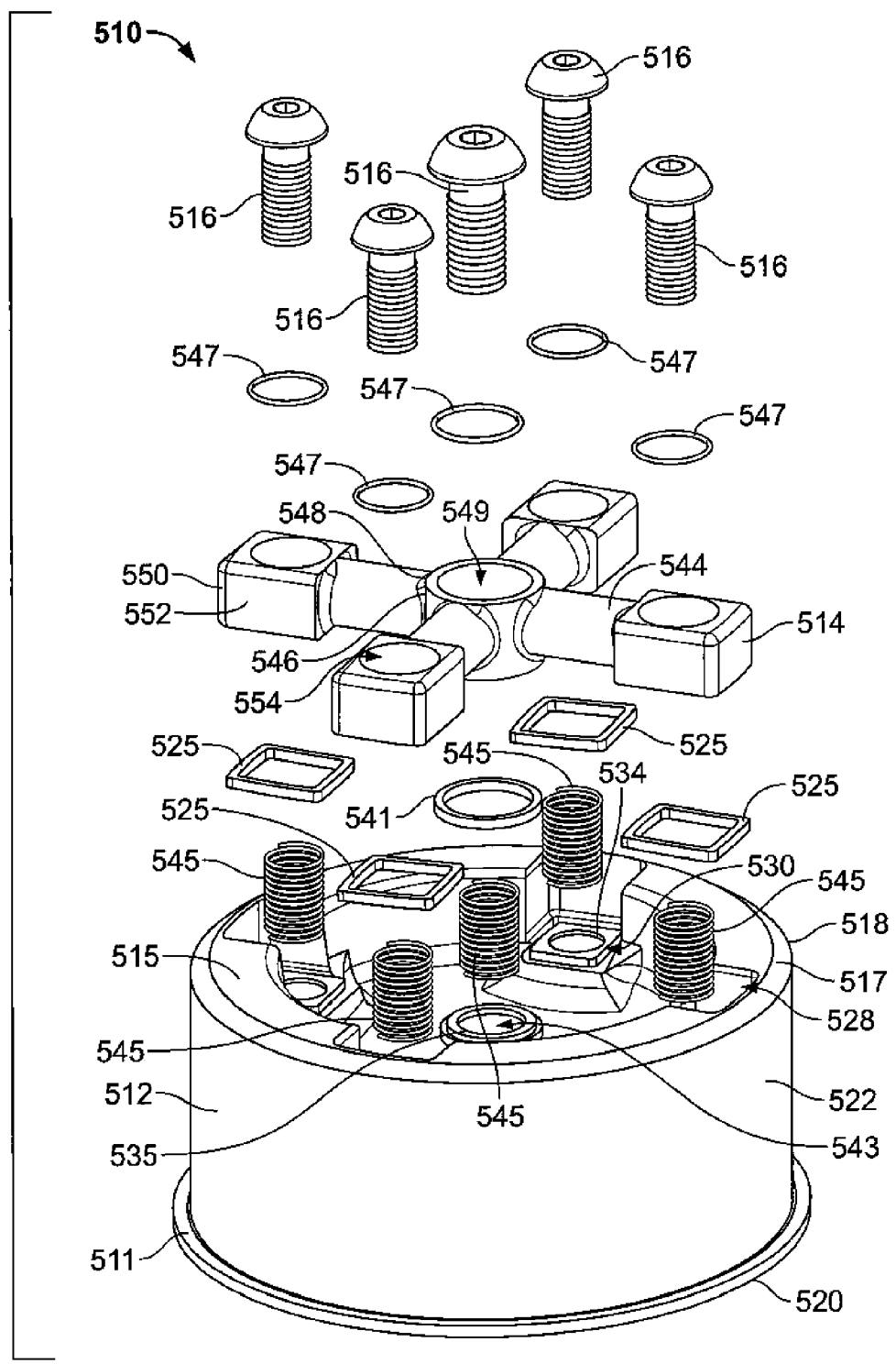
FIG. 16B is an exploded view of the tie down assembly shown in FIG. 16B.
Figure 16C:
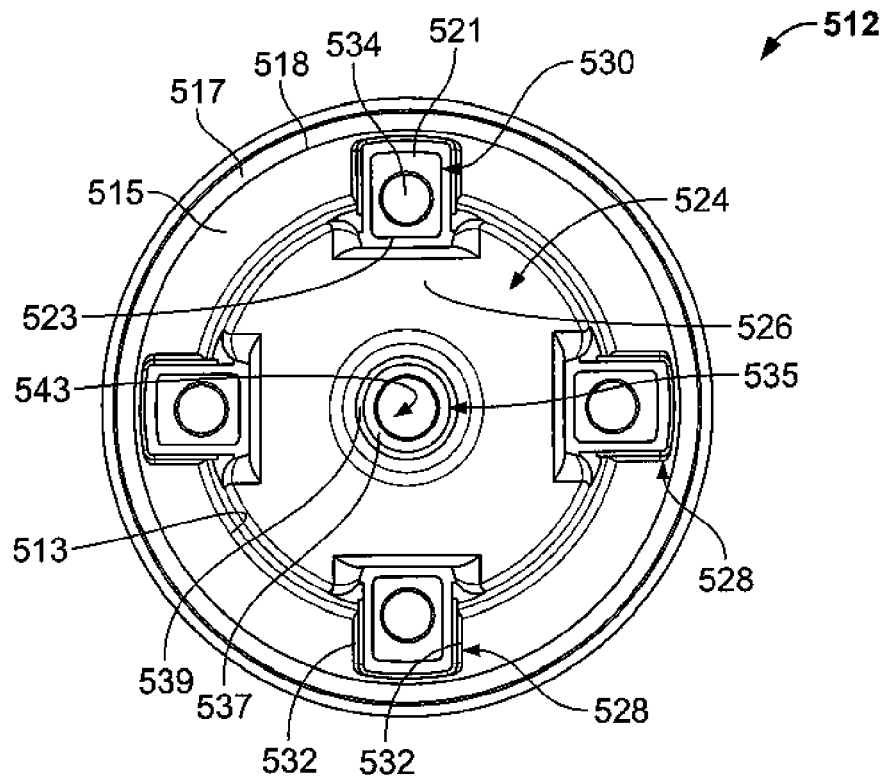
FIGS. 16C and 16D are top and bottom plan views, respectively, of a cup employed by the tie down assembly shown in FIG. 16A.
Figure 16D:
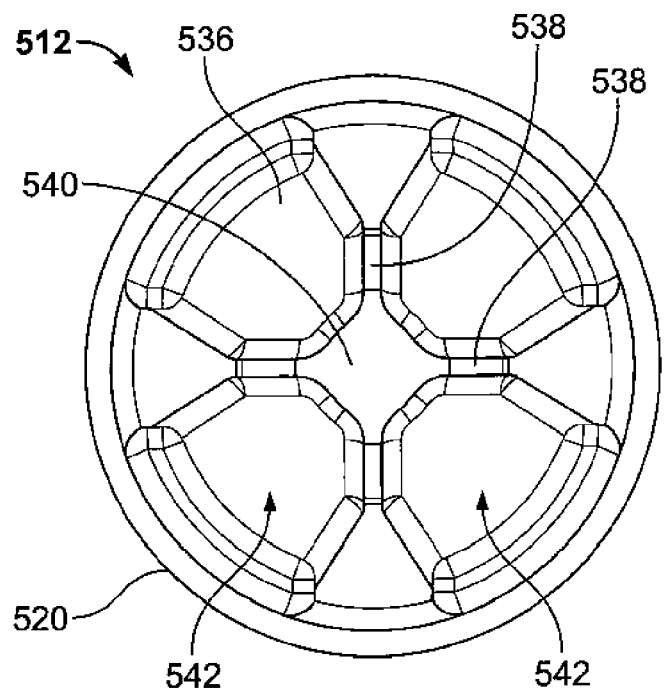

Still referring to FIGS. 16B through 16D, in an embodiment, the cup 512 includes a recess 524 that extends from the upper end 518 and is defined a circular-shaped inner wall 513 and an interior surface 526. In an embodiment, the inner wall 513 includes a ring-shaped upper surface 515 formed proximate to the upper end 518. In an embodiment, the upper surface 515 includes a beveled portion 517. In another embodiment, the upper surface 515 need not include the beveled portion 517. A plurality of square-shaped pockets 528 are formed within the inner wall 513 and extend from the upper surface 515 to the interior surface 526. Each of the pockets 528 includes a square-shaped, raised seat 530 extending upwardly from the interior surface 526. Each seat 530 is positioned intermediate a pair of corresponding opposed walls 532 that extend upwardly from the interior surface 526 of the cup 512 to the upper end 528 of the cup 512. Each of the seats 530 includes a bore 534 that extends towards the lower end 520 of the cup 512. Each of the bores 534 is sized and shaped to receive a corresponding one of the fasteners 516, which will be described in more detail below. In an embodiment, each of the bores 534 includes internal threads 519 (not shown in FIGS. 16B through 16D, but see FIG. 16G). In an embodiment, each of the seats 530 includes a square-shaped stepped portion 521, forming a square-shaped edge portion 523 that is sized and shaped to receive a square-shaped gasket 525 (which are shown in FIG. 16B). The gaskets 525 provide water tight seals and corrosion resistance between the cup 512 and the crossbar 514, and protect the threads of the fasteners 516 from corrosion. In an embodiment, the gaskets 525 are made from VITON®rubber/elastomer as described above. In an embodiment, the cup 512 includes four of the pockets 528 and four of the corresponding seats 530, which are arranged in a cross-like pattern (i.e., positioned 90 degrees from each other). In other embodiments, the cup 512 may include more or less than four of the pockets 528 and the corresponding seats 530.

In an embodiment, the cup 512 includes a centrally-located, circular-shaped raised seat 535 extending upwardly from the interior surface 526 of a recess 524. The seat 535 includes a stepped portion 537 forming a circular-shaped edge 539 that is sized and shaped to receive an O-ring 541 (which is shown in FIG. 16B). In an embodiment, the O-ring 541 is made from VITON® rubber/elastomer as described above, and provides sealing and corrosion resistance functions similar to those of the gaskets 525. The central seat 535 further includes centrally-located threaded bore 543, whose purpose shall be described hereinafter.

In an embodiment, each of the bores 534 and the bore 543 is sized and shaped to receive a threaded insert 545 that threadedly engage a corresponding one of the fasteners 516 (see FIG. 16B). In an embodiment, the threaded inserts 545 are RECOIL® brand of inserts manufactured by Alcoa Fastening Systems, but other brands of the inserts 545 may be utilized. In another embodiment, the inserts 545 need note be utilized and the fasteners 516 may threadedly engage the bores 534, 543 directly.

Referring to FIG. 16D, a lower, exterior surface 536 of the cup 512 includes a plurality of ribs 538 extending therefrom and from the lower end 520 of the cup 512 to a central portion 540, and are separated from one another by a plurality of gaps 542. The ribs 538 provide for strength and stiffness, while the gaps 542 result in mass reduction of the tie down assembly 510. In an embodiment, the ribs 538 are arranged in a cross-like pattern (i.e., positioned 90 degrees from each other) on the exterior surface 536. In other embodiments, the cup 512 may include more or less than four of the ribs 538.

Referring to FIG. 16B, the crossbar 514 includes a plurality of tubular-shaped members 544, each of which has a first end 546 that intersects with the other first ends 546 at a central portion 548, and a free end 550 opposite the first end 546. A centrally located, circular-shaped aperture 549 that extends through the central portion 548. In an embodiment, all of the members 544 lie within the same plane. In an embodiment, the crossbar 514 includes four of the members 544. In other embodiments, the crossbar 514 includes more or less than four of the members 544. In an embodiment, each of the members 544 includes a square-shaped head 552 formed at the free end 550 thereof and a centrally located, circular-shaped aperture 554 extending through the head 552. In other embodiments, each of the heads 552 consists of different shapes and sizes, such as square-shaped, circular-shaped, etc.

In a number of embodiments, the cup 512 and the crossbar 514 may be made from the same materials as described above with respect to the tie down assembly 10, e.g., aluminum, steel, titanium, aluminum alloys. In an embodiment, the cup 512 and the crossbar 514 are produced by forging. In another embodiment, the cup 512 is produced by machining.

Figure 16E:
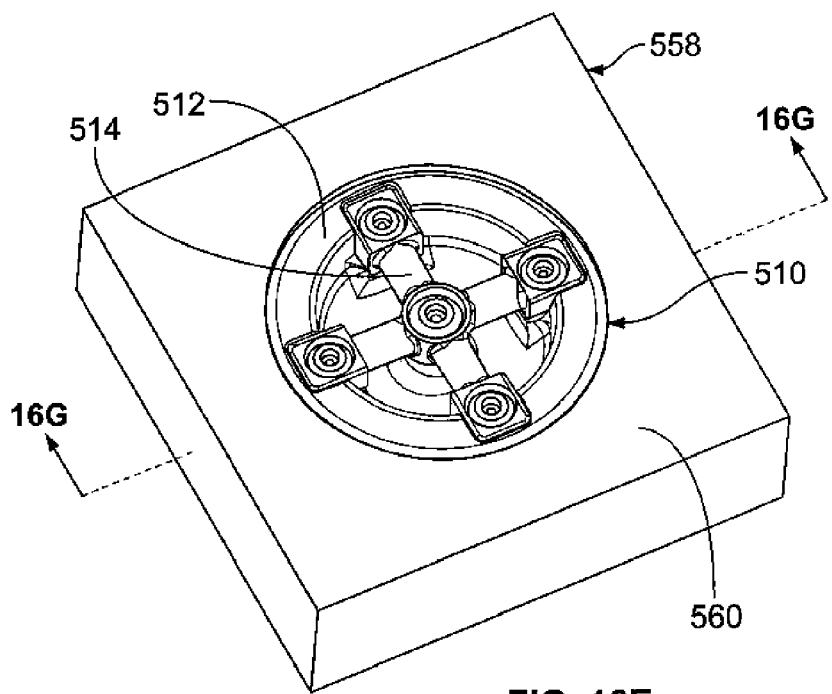
FIGS. 16E and 16F are top and bottom perspective views, respectively, of the tie down assembly shown in FIG. 16A installed within a deck of a vessel.
Figure 16F:
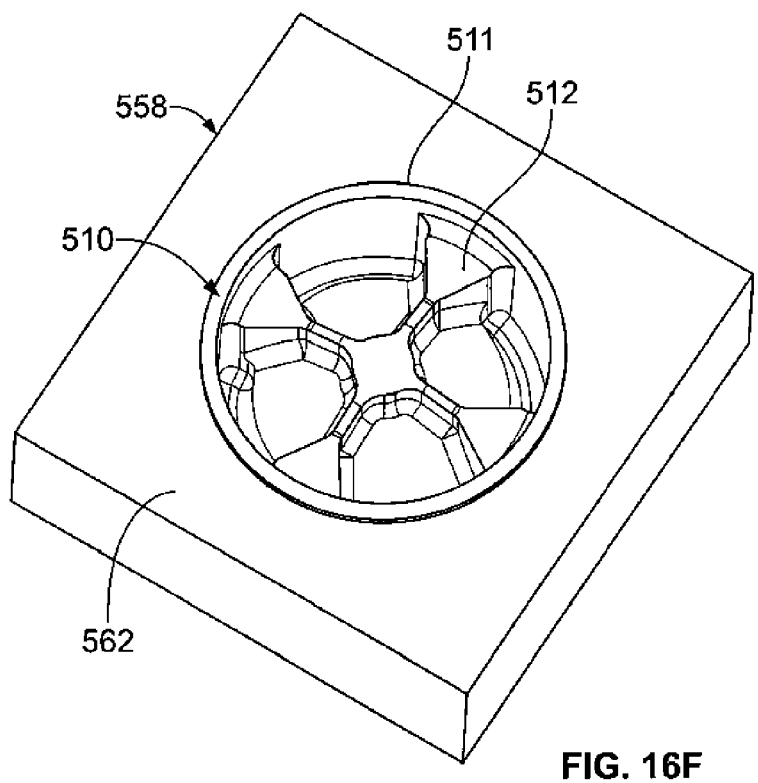
Figure 16G:
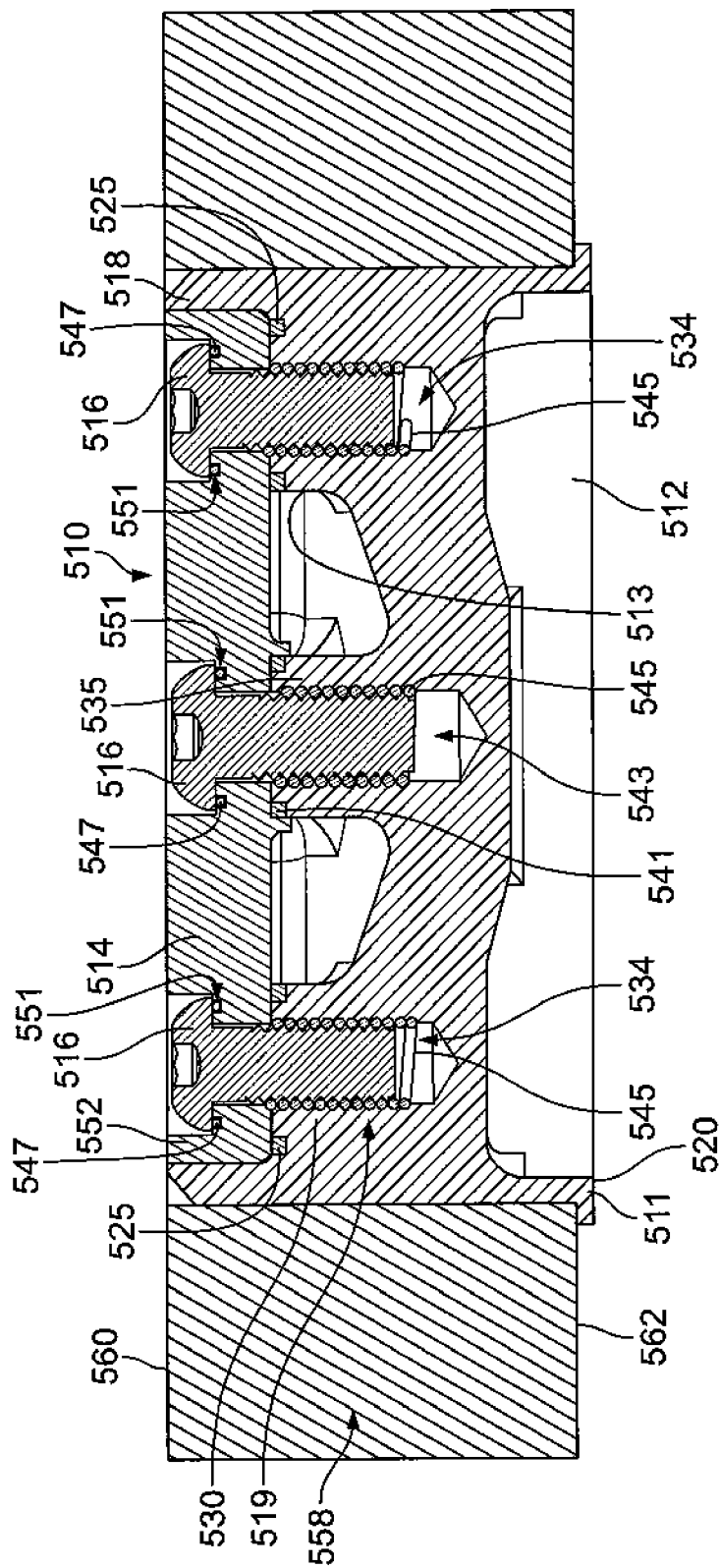
FIG. 16G is a cross-sectional view, taken along line 16G-16G and looking in the direction of the arrows, of the installed tie down assembly shown in FIG. 16E.

Referring to FIGS. 16A, 16B and 16G, the crossbar 514 is fastened to the cup 512 by the fasteners 516. In this regard, the crossbar 514 is positioned within the recess 524 of the cup 512, such that one of heads 552 of the crossbar 514 is positioned within a corresponding one of the pockets 528 of the cup 512. As a result, one of the apertures 554 of the members 544 of the crossbar 514 aligns with a corresponding one of the bores 534 of the cup 512, while the central aperture 549 of the central portion 548 of the crossbar 514 aligns with the central bore 543 of the seat 535 of the cup 512. Each of the fasteners 516 threadedly engages a corresponding one of the bores 534, 543, thereby securing the crossbar 514 to the cup 512. In an embodiment, O-rings 547 are positioned within grooves 551 formed within the crossbar 514 (see FIG. 16G) in order to provide water tight seals and corrosion resistance between the pockets 528 and the heads 552 of the crossbar 514, and protect the threads of the fasteners 516 from corrosion. In an embodiment, the O-rings 547 are made from VITON® rubber/elastomer as described above.

Referring to FIGS. 16E through 16G, the tie down assembly 510 is secured to a deck 558 of a vessel having an exterior surface 560 and an interior surface 562. The tie down assembly 510 is installed to the deck 558 in a manner similar to that described above. In an embodiment, the upper end 518 of the cup 512 lies flush with the exterior surface 560 of the deck 558. In an embodiment, the beveled portion 517 of the cup 512 facilitates a good flush deck weld between the cup 512 and the exterior surface 560 of the deck 558. In an embodiment, the radial clearance between the sidewall 522 of the assembly 510 and the hole of the deck 558 is about 0.0197 inches±0.004 inches (0.5 mm±0.1 mm).

In an embodiment, the flange 511 of the cup 512 abuts the lower surface 562 of the deck 558. In an embodiment, the flange 511, having wrought properties, carries a vertical load applied by the connectors to the tie down assembly 510, and, therefore, such vertical load is not entirely held by the welds.

In another embodiment, as indicated above, the tie down assembly 510 does not include the flange 511. In an embodiment, there exists a tight fit between the heads 552 of the crossbar 514 and the pockets 528 of the cup 512. In an embodiment, the term "tight fit" means a nominal gap of about 0.004 inches (0.1 mm)±0.004 inches (0.1 mm). While the fasteners 516 are designed to carry all loads, the tight fit between the cross 514 and the cup 512 may carry all of the shear and torsional loads that may be developed should slippage occur under the heads of the fasteners 516. In addition, the tie down assembly 510 minimizes open space on the deck 558, and, thus, reduces tripping hazards.

It will be understood that the tie down assemblies 10 through 510 described herein are merely exemplary and that a person skilled in the art may make many variations and modifications without departing from the full spirit and the scope of the embodiment described herein. For example, the tie down assemblies may include failsafe components that enable them to fail prior to damaging the decking if overloaded, thereby saving high repair costs. Although the tie down assemblies are welded to a deck, they could be attached to the deck by other suitable means known in the art, such as fasteners, adhesives, etc. In embodiments for the tie down assemblies 110, 310, 410, and 510, the corresponding centrally located fasteners 116, 316, 416, and 516 respectively, need not be the same sizes as the peripherally located fasteners 116, 316, 416, and 516 respectively. For instance, the centrally located fasteners 116, 316, 416, and 516 can be larger in size, so as to save additional weight and further reduce the diameter of the cups 112, 312, 412 and 512 respectively. The tie down assemblies may be utilized in environments other than naval and maritime vessels, such as, for example, rail, aerospace, and motor vehicle transportation. Accordingly, all such variations and modifications are intended to be included within the scope of the invention as defined in the appended claims.

What is claimed is:

1. A tie down assembly, comprising:
a cup having a first end, a second end opposite the first end, a recess formed within the first end and defining an interior surface and an inner wall surrounding the interior surface, and a plurality of pockets formed within the interior surface, each of the plurality of pockets including a seat and a pair of opposed walls that extend upwardly from the interior surface to the upper end and flank the seat, each of the seats including a bore;
and a crossbar having a central portion and a plurality of members extending from the central portion, each of the plurality of members includes a free end having a head and an aperture formed within the head,
the crossbar being fastened removably to the cup by a plurality of fasteners such that the crossbar is positioned within the recess of the cup, and each of the heads of the plurality of members of the crossbar engages a corresponding one of the plurality of seats of the cup and is positioned between a corresponding one of the pair of opposed walls, each of the apertures of the heads of the plurality of members of the crossbar aligns with a corresponding one of the bores of the plurality of seats of the cup, and each of the apertures of the heads of the plurality of members of the crossbar and the bores of the plurality of seats of the cup is sized and shaped to receive a corresponding one of the plurality of fasteners.

2. The tie down assembly of claim 1, wherein the cup includes a centrally-located seat extending from the interior surface of the cup and having a bore, and the central portion of the crossbar includes an aperture, the central portion of the crossbar engaging the centrally-located seat of the cup, and the aperture of the central portion of the crossbar aligns with the bore of the centrally-located seat of the cup, the aligned aperture of the central portion of the crossbar and the bore of the centrally-located seat of the cup are sized and shaped to receive one of the plurality of fasteners.

3. The tie down assembly of claim 2, further comprising a plurality of threaded inserts each of which is positioned within a corresponding one of the plurality of bores of the plurality of seats of the cup and the bore of the centrally-located seat of the cup, each of the plurality of threaded inserts threadedly engages a corresponding one of the plurality of fasteners.

4. The tie down assembly of claim 3, further comprising a plurality of gaskets each of which is located between each one of the plurality of seats of the cup and a corresponding one of the heads of the plurality of members of the crossbar and between the central portion of the crossbar and the centrally-located seat of the cup.

5. The tie down assembly of claim 4, wherein each of the heads of the plurality of members of the crossbar includes a groove that is sized and shaped to receive an O-ring.

6. The tie down assembly of claim 2, wherein each of the heads of the plurality of members of the crossbar includes a pair of tabs that engage a corresponding one of the plurality of seats of the cup.

7. The tie down assembly of claim 1, wherein each of the heads of the plurality of members of the crossbar includes a pair of tabs that engage a corresponding one of the plurality of seats of the cup.

8. The tie down assembly of claim 1, wherein the cup includes a centrally-located bore formed within the interior surface of the cup, and the central portion of the crossbar includes a stem having an aperture formed therethrough, the aperture of the stem of the crossbar aligns with the centrally-located bore of the cup, the aligned aperture of the stem of the crossbar and the centrally-located bore of the cup are sized and shaped to receive one of the plurality of fasteners.

9. The tie down assembly of claim 8, wherein each of the heads of the plurality of members of the crossbar includes a pair of tabs that engage a corresponding one of the plurality of seats of the cup.

10. The tie down assembly of claim 1, wherein the plurality of pockets of the cup includes four of the pockets, and the plurality of members of the crossbar includes four of the members.

11. The tie down assembly of claim 10, wherein each of the plurality of members of the crossbar extend substantially in a same plane.

12. The tie down assembly of claim 1, wherein the tie down assembly is adapted to be installed within a structure having a first surface, a second surface opposite the first surface, and a hole extending from the first surface to the second surface, the hole being sized and shaped to receive the cup, and, when the cup is installed within the hole, the upper end of the cup lies substantially flush with the first surface of the structure.

13. The tie down assembly of claim 12, wherein the cup includes a flange extending circumferentially from and proximate to the second end of the cup, the flange engaging the second surface of the structure.

14. The tie-down assembly of claim 1, wherein the cup is made from aluminum and the crossbar is made from steel.

15. The tie down assembly of claim 14, wherein the structure is made from aluminum.

16. The tie down assembly of claim 15, wherein the structure includes a deck of a vessel.

17. A tie down assembly, comprising: a cup having a first end, a second end opposite the first end, a recess formed within the first end and defining an interior surface and an inner wall surrounding the interior surface, a plurality of pockets formed within the interior surface each of the plurality of pockets including a seat and a pair of opposed walls that extend upwardly from the interior surface to the upper end and flank the seat, each of the seats including a bore, and a centrally-located seat extending from the interior surface of the cup and having a bore; and a crossbar having a central portion and a plurality of members extending from the central portion, the central portion including an aperture, and each of the plurality of members including a free end having a head with a groove and an aperture formed within the head, the crossbar being fastened removably to the cup by a plurality of fasteners such that the crossbar is positioned within the recess of the cup and each of the heads of the plurality of members of the crossbar is positioned between a corresponding one of the pair of opposed walls of a corresponding one of the plurality of pockets and engages a corresponding one of the plurality of seats of the cup, and the central portion of the crossbar engages the centrally-located seat of the cup, each of the apertures of the heads of the plurality of members of the crossbar aligns with a corresponding one of the bores of the plurality of seats of the cup, and the aperture of the central portion of the crossbar aligns with the bore of the centrally-located seat of the cup, and each of the apertures of the heads of the plurality of members of the crossbar and the bores of the plurality of seats of the cup are sized and shaped to receive a corresponding one of the plurality of fasteners, and the aperture of the central portion of the crossbar and the bore of the centrally-located seat of the cup are sized and shaped to receive one of the plurality of fasteners.

18. The tie down assembly of claim 17, further comprising: a plurality of threaded inserts each of which is positioned within a corresponding one of the plurality of bores of the plurality of seats of the cup and the bore of the centrally-located seat of the cup, each of the threaded inserts threadedly engages a corresponding one of the plurality of fasteners; a plurality of gaskets, each of which is located between a corresponding one of the plurality of seats of the cup and a corresponding one of the heads of the plurality of members of the crossbar and between the central portion of the crossbar and the centrally-located seat of the cup; and a plurality of O-rings each of which are received by a corresponding one of the grooves of the heads of the crossbar.

19. The tie down assembly of claim 18, wherein the cup is made from aluminum and the crossbar is made from steel.

* * * * *

UNITED STATES PATENT AND TRADEMARK OFFICE
CERTIFICATE OF CORRECTION

| | | |
|---|---|---|
| PATENT NO. | : 8,505,868 B2 | Page 1 of 1 |
| APPLICATION NO. | : 12/948931 | |
| DATED | : August 13, 2013 | |
| INVENTOR(S) | : Franklin David Silvio et al. | |

It is certified that error appears in the above-identified patent and that said Letters Patent is hereby corrected as shown below:

In the Specification

Column 9, line 65, delete "note" and insert -- not --.

Signed and Sealed this
Eleventh Day of February, 2014

Michelle K. Lee
*Deputy Director of the United States Patent and Trademark Office*